Figure 1:
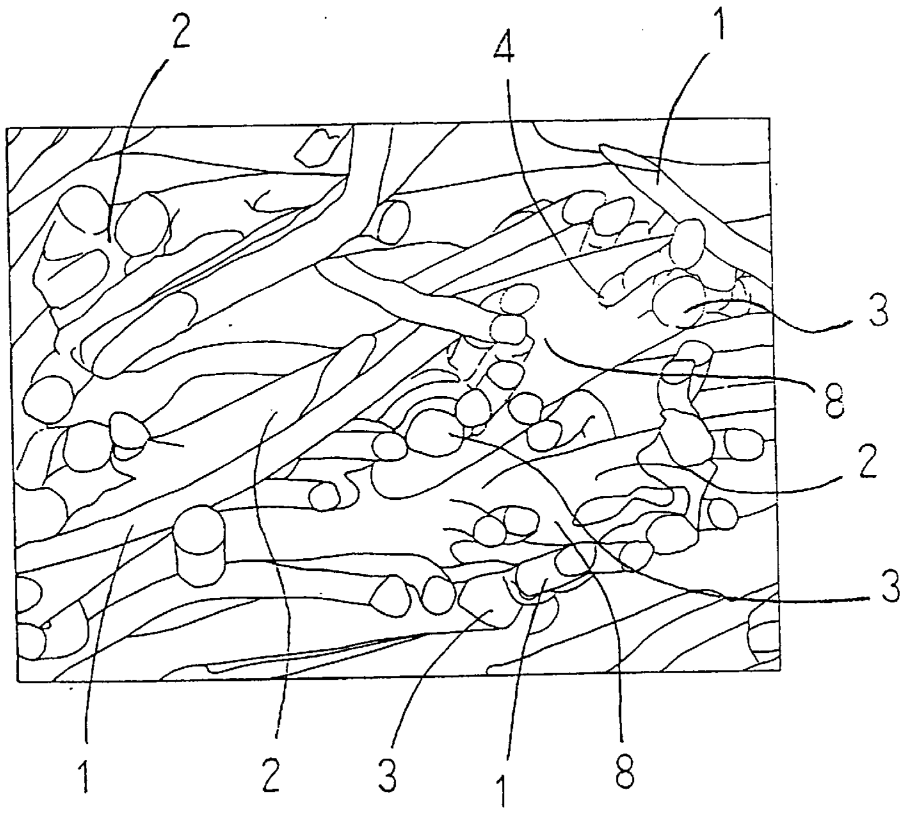
Figure 2:
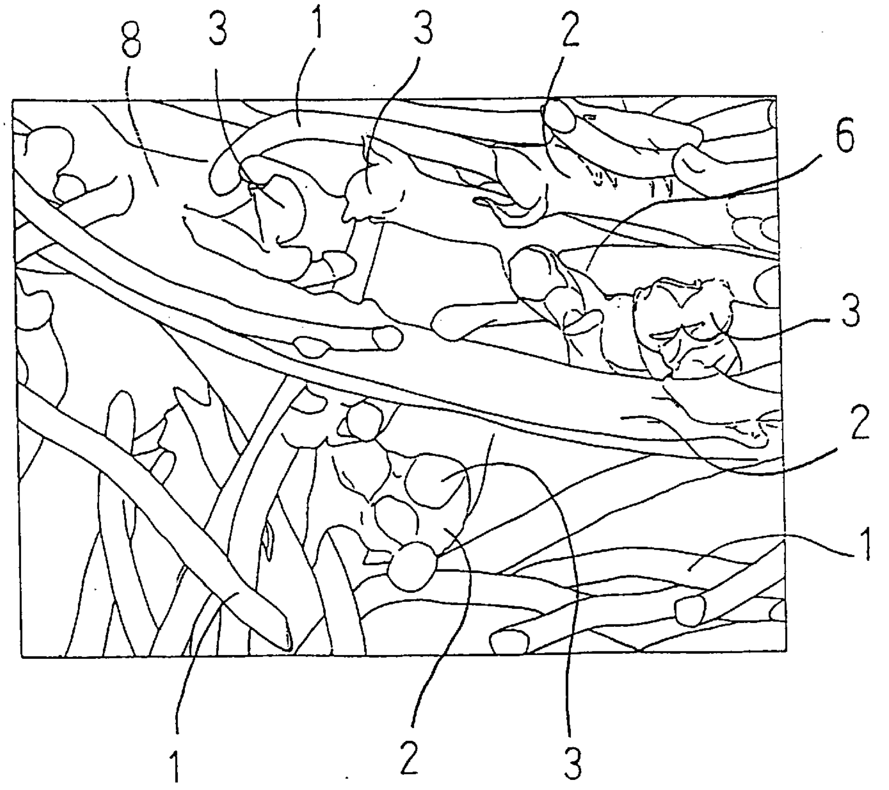
Figure 3:
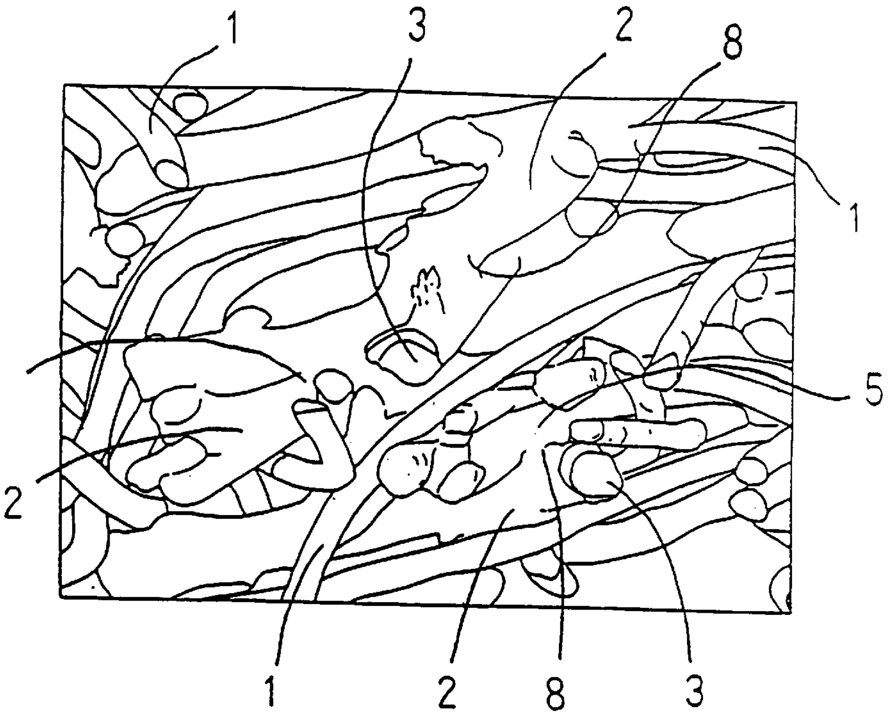
Figure 4:
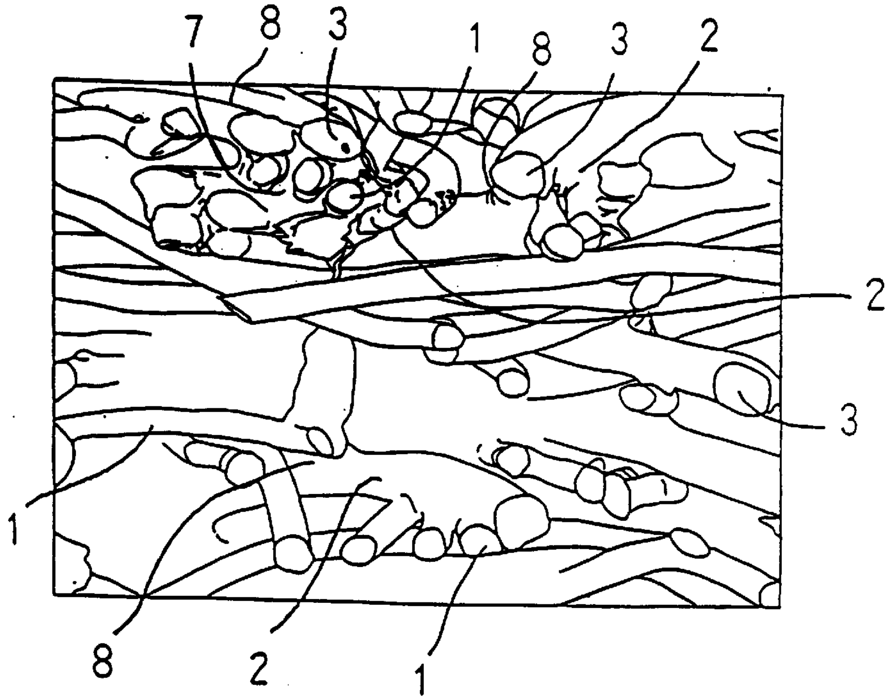
Figure 5:
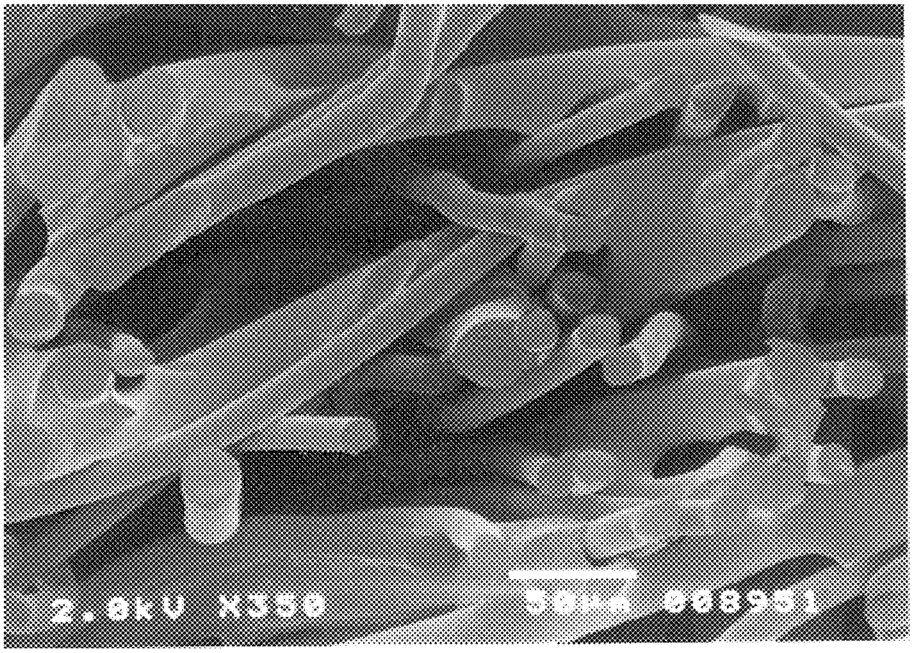
Figure 6:
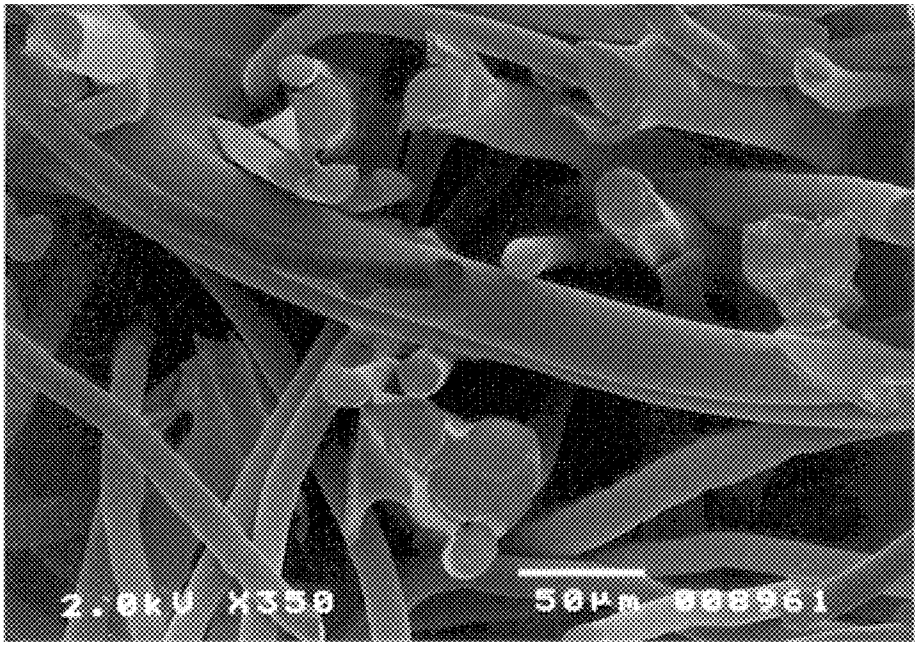
Figure 7:
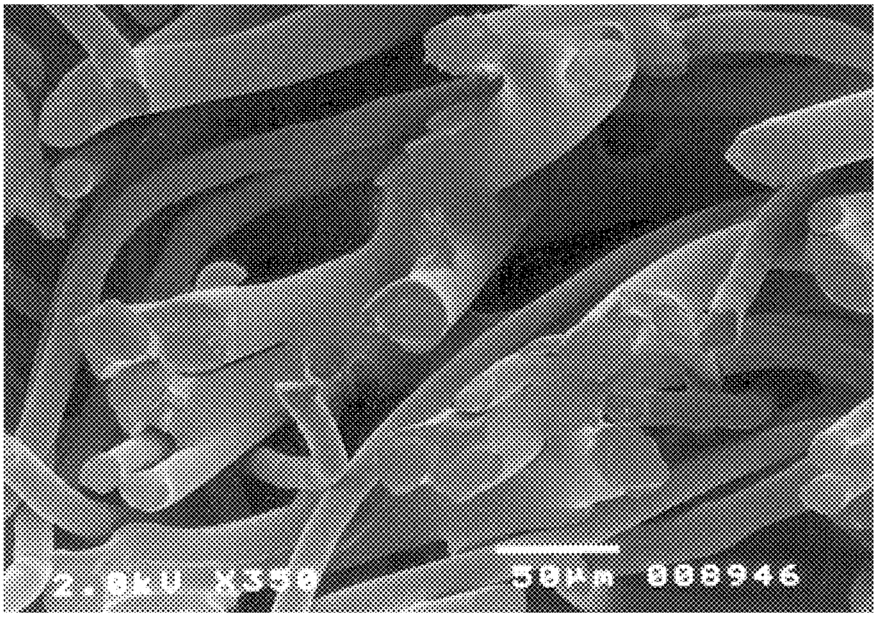
Figure 8:
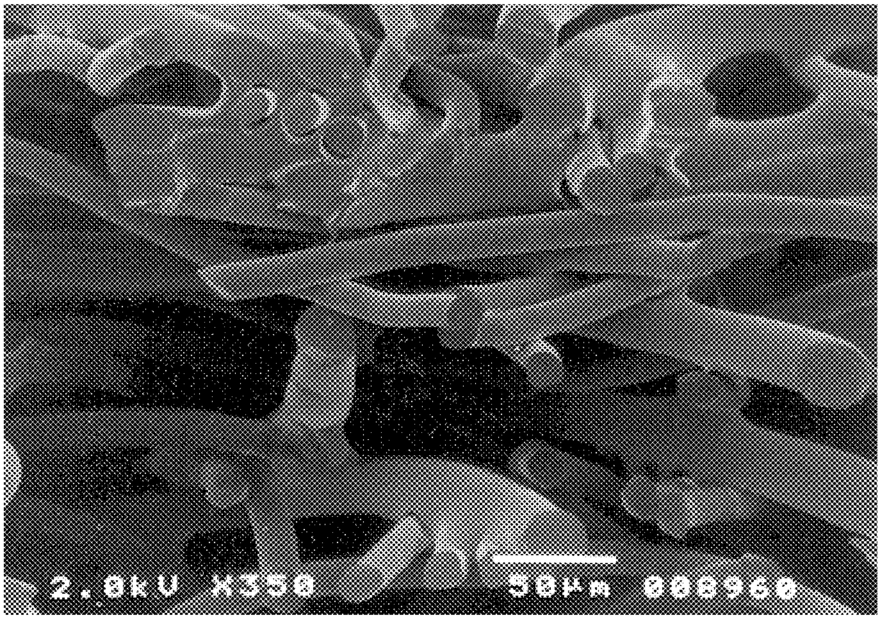

US005993944A

United States Patent [19]

Honna et al.

[11] Patent Number: 5,993,944

[45] Date of Patent: Nov. 30, 1999

[54] NON-IMPREGNATED TYPE SUBSTRATE USEFUL AS BASE FABRIC FOR ARTIFICIAL LEATHER, ARTIFICIAL LEATHER MADE THEREFROM, AND PROCESS FOR THEIR PRODUCTION

[75] Inventors: Hiroshi Honna; Makoto Yoshida; Michikage Matsui, all of Ibaraki, Japan

[73] Assignee: Teijin Limited, Osaka, Japan

[21] Appl. No.: 08/981,445

[22] PCT Filed: Apr. 18, 1997

[86] PCT No.: PCT/JP97/01354

§ 371 Date: Dec. 22, 1997

§ 102(e) Date: Dec. 22, 1997

[87] PCT Pub. No.: WO97/40230

PCT Pub. Date: Oct. 30, 1997

[30] Foreign Application Priority Data

Apr. 22, 1996 [JP] Japan .................................... 8-099966

[51] Int. Cl.$^6$ ................................ B32B 5/02; B32B 5/08

[52] U.S. Cl. .......................... 428/198; 428/151; 428/374; 428/395; 428/904

[58] Field of Search .................................... 428/198, 151, 428/395, 374, 904; 442/401, 402, 403, 407, 408, 411

[56] References Cited

FOREIGN PATENT DOCUMENTS

| | | |
|---|---|---|
| B4218599 | 9/1967 | Japan . |
| 4942772 | 4/1974 | Japan . |
| 5287201 | 7/1977 | Japan . |
| 5620656 | 2/1981 | Japan . |
| B6229548 | 8/1984 | Japan . |
| 7145569 | 6/1995 | Japan . |

*Primary Examiner*—Marion McCamish
*Assistant Examiner*—Ula C. Ruddock
*Attorney, Agent, or Firm*—Sughrue, Mion, Zinn, Macpeak & Seas, PLLC

[57] ABSTRACT

To provide a non-impregnated type substrate useful as a base fabric for artificial leather, which is superior in leather-like handle, air permeability and lightness properties; and an artificial leather made therefrom. A non-impregnated type substrate useful as a base fabric for artificial leather, which is a fiber assembly constituted by matrix fibers and binder fibers having an elastic polymer arranged on the surface thereof, the binder fibers being dispersed in and head-bonded to the matrix fibers, wherein the elastic polymers are contained within a specified amount, the bonds between binder fibers and matrix fibers by the elastic polymer are formed within specified proportions and with particular configurations, and the substrate has a density of 0.15 to 0.45 g/cm$^3$.

49 Claims, 6 Drawing Sheets

NON-IMPREGNATED TYPE SUBSTRATE USEFUL AS BASE FABRIC FOR ARTIFICIAL LEATHER, ARTIFICIAL LEATHER MADE THEREFROM, AND PROCESS FOR THEIR PRODUCTION

TECHNICAL FIELD PERTINENT TO THE INVENTION

The present invention relates to a non-impregnated type substrate. More specifically, the present inventing relates to a non-impregnated type substrate useful as a base fabric for artificial leather, which is superior in leather-like handle, air permeability and lightness properties; and to an artificial leather made therefrom.

PRIOR ART

A number of proposals have heretofore been made on a substrate for artificial leather, having a structure in which a non-woven fabric is impregnated with an elastic polymer (a polyurethane in most cases) as a binder [e.g. Japanese Patent Publication (Kokoku) No. 42-18599, Japanese Laid-Open Patent Publication (Kokai) No. 7-145569 and Japanese Patent Publication No. 62-29548, etc.]. These proposals were made from the standpoint that when a non-woven fabric composed of polymer fibers is used alone, it is difficult to obtain satisfactory levels in handle such as full and tight handle and durability such as strength and shape retention.

As well known, natural leather has a substrate structure in which the upper layer has a dense structure and the lower layer has a sparse structure. On the other hand, the above polyurethane impregnation needs a high level of technique for control of impregnation; and the polyurethane-impregnated substrate, although it is superior in handle and durability, has a dense structure in which a resin is stuffed between fibers and therefore, has low air permeability and is difficult to balance the lightness properties and other required properties. Further, since the polyurethane impregnation uses a solvent, the production steps are complex, the productivity is low, and moreover, a problem arises in an environmental aspect.

Meanwhile, in Japanese Laid-Open Patent Publication No. 52-87201 is proposed a method which comprises forming a sheet-like material from conjugated fibers which are formed of a non-elastic polymer and an elastic polymer, said elastic polymer occupying at least part of the fiber surfaces, and then subjecting the sheet-like material to a heating treatment under pressure at a temperature not lower than the heat-bonding temperature of the elastic polymer to make dense the surface layer of the sheet-like material. In the method described in the above publication, the main point lies at allowing the surface layer of the sheet-like material to have a dense structure, and if the aim is limited to the surface of the sheet-like material, the surface of the sheet-like material can certainly have an appearance similar to that of natural leather. However, the resulting material, when used as leather, has a drawback that it has rubber-like hard handle.

PROBLEMS THAT THE INVENTION INTENDS TO SOLVE

Objects of the present invention are to eliminate the above-mentioned drawbacks of the prior art and provide a non-impregnated type substrate useful as a base fabric for artificial leather, which uses a small amount of a binder, and yet has leather-like handle, excellent air permeability, excellent capability for elastic recovery and is light; and a process for production of the same.

Other objects of the present invention are to provide a novel base fabric for artificial leather formed from a non-impregnated type substrate, provided by the present invention, having an elastomer layer formed on the surface thereof; and a process for production of the same.

MEANS FOR SOLVING THE PROBLEMS

In the conventional impregnation method, desired handle of artificial leather has been obtained by setting the weight ratio of elastic polymer at a high level of 25 to 45% based on the total weight of the substrate, but studies by the present inventors have revealed surprisingly that when a specified structural change is given to a known cushioning material constituted by matrix fibers and binder fibers, the resulting cushioning material can be converted into an artificial leather having greatly improved air permeability in particular, even when the proportion of elastic polymer used therein is 25% by weight or less.

The present inventors have also found that the handle required when a substrate is converted into an artificial leather, is caused not only by the surface structure of the substrate but also by the internal structure of the substrate.

That is, according to the present invention, it has been found that the above-mentioned object of the present invention can be achieved by a non-impregnated type substrate useful as a base fabric for artificial leather, which is a fiber assembly constituted by matrix fibers and binder fibers having an elastic polymer arranged on the surface thereof, the binder fibers being dispersed in and heat-bonded to the matrix fibers, wherein the substrate satisfies the following requirements (a) to (e):

(a) the proportion of the elastic polymer based on the total weight of the substrate is within a range of from 2.5 to 25% by weight, (b) the density of the substrate is within a range of from 0.15 to 0.45 g/cm$^3$, (c) the substrate contains in a scattered states (c-1) units of single heat-bonded spot each formed by the heat-bonding of the elastic polymer constituting the binder fiber to a single matrix fiber, and (c-2) units of composite heat-bonded spot each formed by the heat-bonding of the elastic polymer constituting the binder fiber to an assembly of a plurality of matrix fibers being in a close proximity to each other, (d) each unit of single heat-bonded spot and each unit of composite heat-bonded spot have (d-1) wholly heat-bonded portions at which part of matrix fibers are covered by the elastic polymer on the entire circumferential length in a state that the polymer is heat-bonded to the matrix fibers, and (d-2) partially heat-bonded portions at which the other part of matrix fibers are covered by the elastic polymer on the entire circumferential length in a state that part of the interface between the matrix fiber and the elastic polymer is heat-bonded and the remainder of the interface between the matrix fiber and the elastic polymer is in no contact state, (d-3) the ratio of the number of the wholly heat-bonded portions and the number of the partially heat-bonded portions being within a range of from 35:65 to 75:25, and (e) in each crossing point between the binder fibers, an elastic heat-bonded spot heat-bonded by the elastic polymer is formed.

According to the present invention, it was further found that a process for producing a non-impregnated type substrate useful as a base fabric for artificial leather, in which process the above non-impregnated type substrate constituted by matrix fibers and binder fibers having an elastic polymer arranged at the surface thereof, the binder fibers being dispersed in and heat-bonded to the matrix fibers, can be produced, wherein the process comprises the following steps (f) and (g) successively and further comprises, at any stage prior to the step (g), a step of hindering the formation of heat-bonded portions between the two fibers at part of crossing points between the matrix fibers and binder fibers;

(f) a step in which a web containing at least matrix fibers and binder fibers is subjected to a forced tanglement treatment and a shrinkage treatment, and (g) a step in which the resulting non-woven fabric is subjected to a heating treatment under pressure at a heat-bonding temperature of the binder fiber.

In the non-impregnated type substrate of the present invention, the proportion of elastic polymer based on the total weight of substrate must be within a range of from 2.5 to 25%. When the proportion is smaller than 2.5%, the amount of units of single heat-bonded spot and units of composite heat-bonded spot in the internal structure of substrate is too small and in consequence, the substrate can not have elasticity of required level. On the other hand, when the proportion exceeds 25%, the amount of the above two kinds of heat-bonded spots in the inside of the substrate is too large and the resulting substrate has rubber-like hard handle. For these reasons, it is more preferable that the proportion of elastic polymer is within a range of from 5 to 15%.

In the present invention, the substrate must have a density of 0.15 to 0.45 $g/cm^3$. When the density is lower than 0.15 $g/cm^3$, the substrate can not have full and tight handle such as possessed by leather because of its sparse structure. On the other hand, when the density exceeds 0.45 $g/cm^3$, the substrate is inferior in bulkiness, making it difficult to obtain lightness properties and flexibility.

Further, the substrate of the present invention must satisfy all of the above-mentioned requirements (c) to (e) at the same time. These requirements (c) to (e) are explained specifically and detailedly with reference to the accompanying drawings and photographs. FIG. 5 to FIG. 8 are each an electron micrograph (about 350 magnification) of the cross section of the scatteringly existing heat-bonded spot units and heat-bonded portions in the cross section of a non-impregnated type substrate of the present invention, and FIG. 1 to FIG. 4 are hand-written copies of the FIGS. 5 to 8 photographs, respectively, and have been prepared for facilitating explanation and understanding of the states of the heat-bonded spot units and heat-bonded portions.

That is, in FIGS. 1 to 4, 1 is a matrix fiber; 2 is an elastic polymer arranged in the binder fiber so as to be exposed at the surface thereof; and 3 is a core portion arranged in the binder fiber.

The common feature of FIGS. 1 to 4 is that the non-impregnated type substrate of the present invention is constituted by the above-mentioned 1, 2 and 3, in which the above-mentioned spots (c-1) and (c-2) are formed and each of the (c-1) spots and the (c-2) spots has (d-1) portions (4 and 5 in the drawings) and (d-2) portions (6 and 7 in the drawings), respectively, and further, elastic heat-bonded spots of the above-mentioned requirement (e) (8 in the drawings) are formed.

In the substrate of the present invention, (c-1) spots (units of single heat-bonded spot) are formed, and each (c-1) spot has (d-1) portions (wholly heat-bonded portion) 4 and (d-2) portions (partially heat-bonded portion) 6. Since the (c-1) spot has portions (wholly heat-bonded portion) 4 having complete physical bonding between the elastic polymer 2 and single matrix fiber 1 and a portion (partially heat-bonded portion) 6 having incomplete physical bonding between elastic polymer 2 and single matrix fibers 1, there can be obtained a base fabric having flexibility and leather-like handle with tightness.

Further, in the substrate of the present invention, (c-2) spots (units of composite heat-bonded spot) are formed and, and each (c-2) spot has (d-1) portions (wholly heat-bonded portion) 5 and (d-2) portions (partially heat-bonded portion) 7. Since the (c-2) spot has portions (wholly heat-bonded portion) 5 having complete physical bonding between elastic polymer 2 and a plurality of matrix fibers 1 and portions (partially heat-bonded portion) 7 having incomplete physical bonding between the elastic polymer 2 and a plurality of matrix fibers 1, there can be obtained a base fabric having no rubber-like handle but having a strength. Since presence of heat-bonded portions of too large size results in a base fabric of inferior texture, the number of the matrix fibers forming each heat-bonded portion is preferably within a range of from 2 to 5.

It is preferable that in part of the matrix fibers, at least 65% of the circumferential length in cross section of fiber is in no contact with the elastic polymer. When the no contact portion occupies at least 65%, even if heat-bonded portions are formed in the portions contacting with the elastic polymer, these matrix fibers are not substantially fixed in the substrate by the heat-bonded portions, so that a substrate having compliant handle can be obtained.

It is also preferable that in part of the matrix fibers, at least 35% of the circumferential length in cross section of fiber is in contact with the elastic polymer. When the contact portion occupies at least 35%, these matrix fibers are substantially fixed in the substrate when heat-bonded portions are formed in the portions contacting with the elastic polymer, and hence, the resulting substrate can have a strength of required level.

Having elastic heat-bonded spots 8 of the requirement (e), the non-impregnated type substrate of the present invention can have capability for elastic recovery which is one of the requirements as the substrate) of the same level as impregnation type substrates have.

Further, in the present substrate, the ratio of the total number of the (d-1) portions (wholly heat-bonded portions) 4 and 5 and the total number of the (d-2) portions (partially heat-bonded portions) 6 and 7 must be within a range of from 35:65 to 65:35. When the proportion of the wholly heat-bonded portions is less than 35% (the proportion of the partially heat-bonded portions is more than 65%), the substrate suffers severe deterioration of properties with the lapse of time. On the other hand, when the proportion of the wholly heat-bonded portions is more than 65% (the proportion of the partially heat-bonded portions is less than 35%), the wholly heat-bonded portions formed in the substrate are too many and in consequence, the resulting substrate has rubber-like handle.

Further, in the present substrate, it is preferable that the ratio of the total number of the (d-1) portions (wholly heat-bonded portions) 4 and 5 and the (d-2) portions (partially heat-bonded portions) 6 and 7 to the total number of the elastic heat-bonded spots [(e) spots] 8 is within a range of from 95:5 to 75:25. When the proportion of the elastic heat-bonded spots is small, the substrate is difficult to show sufficient capability for elastic recovery. On the other hand, when the proportion is large, the elastic heat-bonded spots contained in the substrate are too many and the obtained substrate tends to have rubber-like handle.

Figure 9:
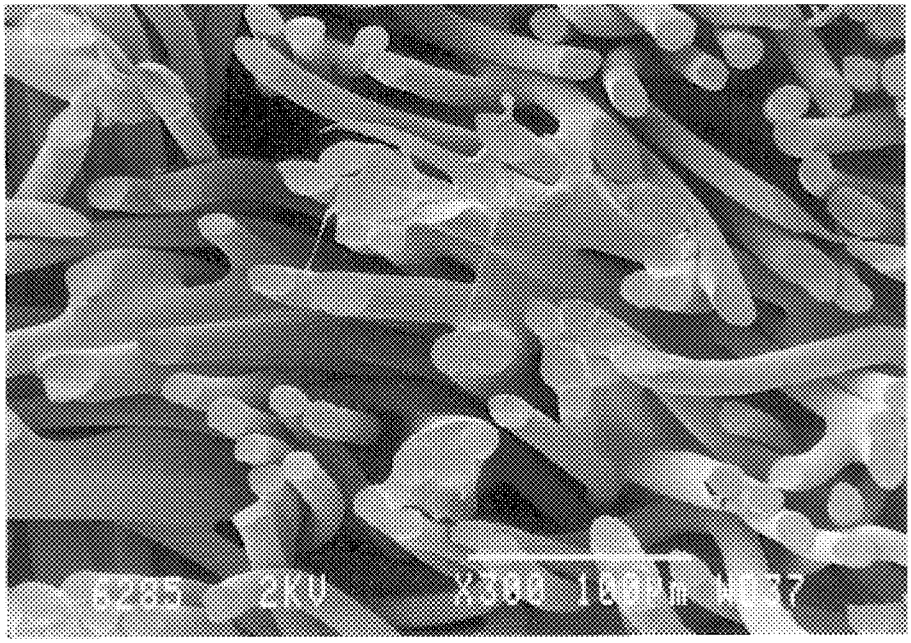
Figure 10:
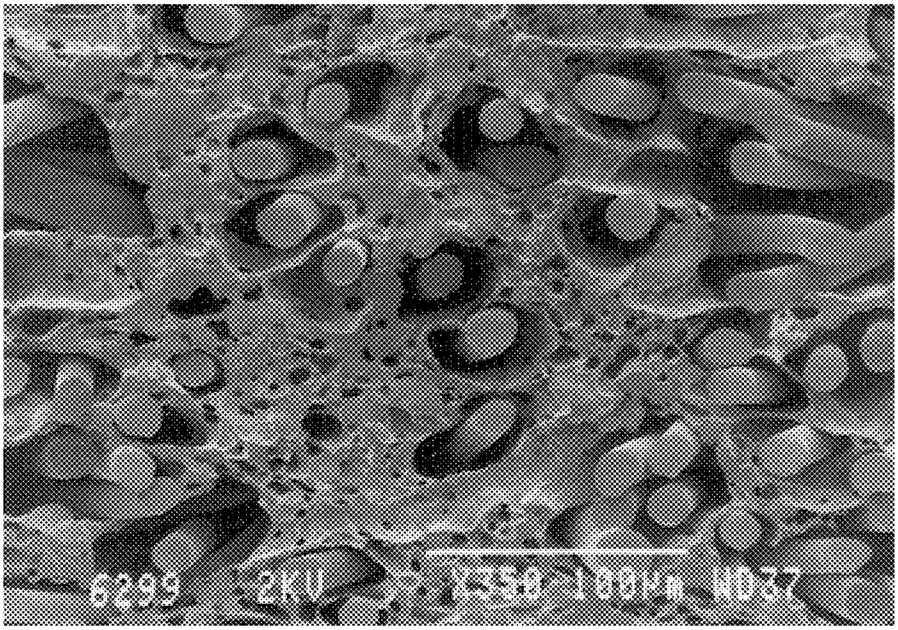

For comparison, there are shown, in FIG. 9, an electron micrograph of the section of the conventionally known non-impregnated type substrate obtained in Comparative Example 1 and, in FIG. 10, an electron micrograph of the section of the conventionally known non-impregnated type substrate obtained in Referential Example 3.

As is clear from the comparison between FIGS. 5 to 8 which are the sectional photographs of the present non-woven fabric and FIGS. 9 to 10, the substrate of FIG. 9 comprises substantially only wholly heat-bonded portions and comprises no partially heat-bonded portions as seen in the substrate of the present invention, and it is apparent that by comprising partially heat-bonded portions, the substrate of the present invention has excellent handle as compared with the conventional non-impregnated type base fabrics. The substrate of FIG. 10 is impregnated with a polyurethane. It is apparent that although the polyurethane per se has a fine structure, the substrate as a whole is inferior in air permeability to the non-impregnated type substrate of the present invention.

In the present invention, the blending ratio of the matrix fibers and the binder fibers is preferably in a weight ratio of 95:5 to 50:50. When the matrix fibers are present in an amount of larger than 95% by weight, heat-bonded spots of sufficient number are hardly formed. On the other hand, when the binder fibers are present in an amount of larger than 50% by weight, the resulting substrate tends to have hard handle such as possessed by rubber.

It is preferable that part of the matrix fibers have a releasing agent adhered on the surface thereof. Herein, the releasing agent refers to a substance having a function capable of hindering the heat-bonding between matrix fibers and binder fibers. The adhesion of the releasing agent makes relatively easy the formation of partially heat-bonded portions in the internal structure of the present substrate.

In the present invention, the weight ratio of the matrix fibers (A-1) having a releasing agent adhered thereon and the matrix fibers (A-2) having no releasing agent adhered thereon is preferably within a range of from 99:1 to 20:80. When the matrix fibers (A-1) are present in an amount of more than 99% by weight, the number of the wholly heat-bonded portions formed between matrix fibers and binder fibers is too small and the resulting substrate lacks in toughness. On the other hand, when the matrix fibers (A-2) are present in an amount of more than 80% by weight, the number of the wholly heat-bonded portions is too large and the resulting substrate has rubber-like hard handle.

Further, the amount of the releasing agent is preferably within a range of from 0.1 to 5.0% by weight based on the fiber weight of the matrix fibers (A-1). When the amount is smaller than 0.1% by weight, the releasing agent can not sufficiently exhibit the formability of partially heat-bonded portions. On the other hand, when the amount is larger than 5.0% by weight, the resulting substrate tends to have reduced tensile strength.

Examples of the releasing agent include silicon-containing compounds such as dimethyl polysiloxane, epoxy-modified polysiloxane, amino-modified polysiloxane, methylhydrogen polysioxane, methoxypolysiloxane and the like; and fluorine-containing compounds such as tetrafluoroethylene resin, tetrafluoroethylene-containing copolymer, modified fluorinated resin and the like. Of these, preferred are silicon-containing compounds in view of the processability, cost and performance, more preferred is a polysiloxane, and most preferred is a dimethylpolysiloxane.

In the present invention, the matrix fibers have a monofilament size of preferably 0.5 to 50 deniers. When the size is smaller than 0.5 denier, the resulting substrate has a low strength, while when the size is larger than 50 deniers, the resulting substrate is stiff. Therefore, the size is particularly preferably 1.0 to 20 deniers. The matrix fibers may consist of long fibers or short fibers. The fiber length, however, is within a range of from preferably 10 to 200 mm, particularly preferably 20 to 150 mm in view of the uniform dispersion of the matrix fibers in a substrate. Further, the matrix fibers preferably have crimp because the crimp gives good tanglement between fibers. In that case, the crimp percent is preferably 5 to 50% and the number of crimp is preferably 5 to 30 per inch. In order to make the tanglement better, the crimp percent and the number of crimp are particularly preferably 5 to 30% and 5 to 20 per inch, respectively.

The sectional shape of the matrix fibers may be a circular, flat, non-circular or hollow shape. However, a hollow sectional shape is preferred because it can contribute to the lightness properties of substrate and moreover can give fibers having low bending strength and hence, the resulting substrate can have flexibility.

The matrix fibers of the present invention preferably have a tensile strength of 1 to 10 g/de. When the tensile strength is lower than 1 g/de, the resulting substrate has a low strength. On the other hand, when the tensile strength is higher than 10 g/de, the matrix fibers are stiff and the resulting substrate can not have flexibility. The particularly preferable tensile strength is 2 to 8 g/de.

In the present invention, the binder fibers are each constituted by an elastic polymer and a non-elastic polymer, and the elastic polymer is preferably exposed at the fiber surfaces. Particularly preferably, the elastic polymer is exposed at the fiber surfaces so as to occupy 30% of the fiber surface area. When the elastic polymer is not exposed at the fiber surfaces so as to occupy at least 30% of the fiber surfaces, the binder fibers have no sufficient functions as binder fiber, i.e. no sufficient formability of heat-bonded portions.

Specific configuration of the binder fibers may be either a side-by-side type or a sheath-core type with the latter type being preferred. In the latter type, the non-elastic polymer constitutes a core portion, and the core may be concentric or eccentric relative to the sheath. The eccentric core is preferred because there develops coil-shaped elastic crimp. The sectional shape of the binder fibers may be any of a circular, flat, non-circular and hollow shape.

When the monofilament size of the binder fibers is small, the elasticity tends to be insufficient, while when the monofilament size is large, the resulting substrate tends to have a stiff surface. Therefore, the binder fibers preferably have a size of 1 to 50 deniers, particularly 1 to 20 deniers. The binder fibers may be long fibers or short fibers, while use of short fibers is advisable in view of uniform dispersion of binder fibers being preferred. The length of short fibers is preferably 10 to 200 mm, more preferably 20 to 150 mm.

When the binder fibers having the above-mentioned constitution are used, the non-elastic polymer and the elastic polymer are preferably conjugated so that they are not separated from each other when the binder fibers are subjected to a heating treatment under pressure. When binder fibers containing polymers which are easily separated from each other are used, it is difficult to form elastic heat-bonded spots at which the crossing point between binder fibers is heat-bonded by the elastic polymer.

The non-elastic polymer constituting the binder fiber is not particularly restricted as long as it is a thermoplastic non-elastic polymer, while nylons or polyesters are preferred with the polyester being particularly preferred in view of the physical properties such as heat resistance and strength. The non-elastic polyester polymer includes, for example, ordinary polyethylene terephthalate, polybutylene terephthalate, polyhexamethylene terephthalate, poly-1,4-dimethylcyclohexane terephthalate and polypivalolactone. Of these, preferred are polyethylene terephthalate and polybutylene terephthalate.

The elastic polymer used in the present invention is not particularly restricted as long as it is a thermoplastic elastic polymer, while a polyurethane elastomer or a polyester elastomer is preferred and a polyester elastomer is particularly preferred.

Typical examples of the polyurethane elastomer are polymers obtained by a reaction of a low-melting polyol having a number-average molecular weight of about 500 to 6,000 such as a polyether having a dihydroxyl group at both terminals, a polyester having a dihydroxyl group at both terminals, a polycarbonate having a dihydroxyl group at both terminals or a polyesteramide having a dihydroxyl group at both terminals, an organic diisocyanate having a molecular weight of 500 or less such as p,p'-diphenylmethane diisocyanate, tolylene diisocyanate, isophorone diisocyanate, hydrogenated diphenylmethane diisocyanate, xylylene diisocyanate, 2,6-diisocyanatemethyl caproate or hexamethylene diisocyanate, and a chain extender having a molecular weight of 500 or less such as glycol, aminoalcohol or triol. Of these polymers, particularly preferred are polyurethanes formed by using, as the polyol, a polytetramethylene glycol, a poly-ϵ-caprolactone or a polybutylene adipate having a dihydroxyl group at both terminals. As the organic diisocyanate, p,p'-diphenylmethane diisocyanate is preferred. In this case, as the chain extender, p,p-bishydroxyethoxybenzene and 1,4-butanediol are preferred. The polymers may of course contain various stabilizers, an ultraviolet absorber, etc. as necessary.

As the polyester elastomer, there are preferred polyether ester blocked copolymers comprising a thermoplastic polyester as hard segments and a polyalkylene glycol as soft segments. Specifically, copolymers produced from the following compounds (I), (II) and (III) are preferred:

(I) at least one member selected from aromatic dicarboxylic acids such as terephthalic acid, isophthalic acid, phthalic acid, 2,6-naphthalenedicarboxylic acid, 2,7-naphthalenedicarboxylic acid, diphenyl-4,4'-dicarboxylic acid, diphenoxyethane-dicarboxylic acid, sodium 3-sulfoisophthalate and the like; alicyclic dicarboxylic acids such as 1,4-cyclohexanedicarboxylic acid and the like; aliphatic dicarboxylic acids such as succinic acid, oxalic acid, adipic acid, sebacic acid, dodecanedioic acid, dimer acid and the like; and ester-forming derivatives thereof, (II) at least one member selected from aliphatic diols such as 1,4-butanediol, ethylene glycol, trimethylene glycol, tetramethylene glycol, pentamethylene glycol, hexamethylene glycol, neopentyl glycol, decamenthylene glycol and the like; alicyclic diols such as 1,1-cyclohexanedimethanol, 1,4-cyclohexanedimethanol, tricyclodecanedimethanol and the like; and ester-forming derivatives thereof, and (III) at least one glycol selected from polyalkylene glycols having an average molecular weight of about 400 to 5,000, such as polyethylene glycol, poly-1,2-propylene glycol, poly-1,3-propylene glycol, ethylene oxide-propylene oxide copolymer, ethylene oxide-tetrahydrofuran copolymer and the like.

Of the above-mentioned polyester elastomers, particularly preferred are polyether polyester block copolymers comprising a polybutylene terephthalate as hard segments and a polyoxybutylene glycol as soft segments, in view of the heat-bondability with matrix fibers, temperature properties and strength. The polyester moiety constituting the hard segment is a polybutylene terephthalate composed of terephthalic acid as a main acid component and butylene glycol as a main diol component. Of course, part (generally, 30 mole % or less based on the total acid components) of the acid components may be replaced by other dicarboxylic acids or oxycarboxylic acids, and part (generally, 30 mole % or less based on the total glycol components) of the glycol components may be replaced by dioxy components other than butylene glycol.

The polyether moiety constituting the soft segment may be a polyether substituted with a dioxy component other than butylene glycol. The polymers may contain a variety of stabilizers, ultraviolet absorbers and the like, as necessary.

The melting point of the elastic polymer is preferably lower than that of the non-elastic polymer by 30 to 120° C., particularly 40 to 80° C. The melting point of the elastic polymer is generally 120 to 220° C., preferably 140 to 180° C. The melting point of the non-elastic polymer is generally 200 to 300° C., preferably 220 to 260° C. In the present invention, the "melting point" is a value measured by the DSC method and, when the compound has no melting point, its "softening point" was regarded as "melting point". In the present invention, a "non-elastic polymer" is defined as a polymer showing, when made into a film or a fiber, a 50%-elongation recovery of less than 50%, preferably 20% or less, while an "elastic polymer" was defined as a polymer showing said recovery of 50% or more, preferably 70% or more.

In the present invention, the non-elastic polyester fibers constituting the matrix fibers are monofilaments formed of ordinary polyethylene terephthalate, polybutylene terephthalate, polyhexamethylene terephthalate, polytetramethylene terephthalate, poly-1,4-dimethylcyclohexane terephthalate, polypivalolactone or copolyester thereof; a mixture of these monofilaments; conjugated fibers composed of two or more of the above polymers; and so forth. The sectional shape of each single fiber may be a circular, flat, non-circular or hollow shape. Monofilaments formed of polyethylene terephthalate, poly-butylene terephthalte or a copolymer of these are particularly preferred.

In the present invention, the matrix fibers preferably contain highly shrinkable fibers. Herein, the "highly shrinkable fibers" refer to fibers having a shrinkage of 20 to 70%, preferably 30 to 60% when immersed in hot water of 70° C. for one minute. As examples of the highly shrinkable fibers, there can be mentioned nylon fibers and polyester fibers with the latter fibers being preferred from the standpoints of the physical properties such as heat resistance, strength and the like. Examples of the highly shrinkable polyester fibers include ordinary polyethylene terephthalate, polybutylene terephthalate, polyhexamethylene terephthalate, poly-1,4-dimethylcyclohexane terephthalate, polypivalolactone or the like.

Further, in the present invention, the matrix fibers preferably contain self-extensible fibers because the resulting substrate has good tanglement between fibers. Herein, the "self-extensible fibers" refer to fibers causing substantially no shrinkage when immersed in hot water of 70° C. for one minute and having an elongation of 5% or more when, after the immersion, kept in an atmosphere of 180° C. for one minute. As the self-extensible fibers, there can be given nylon or polyester fibers.

The matrix fibers of the present invention can be a mixture of ordinary fibers (regular fibers) with the above-mentioned highly shrinkable fibers and/or self-extensible fibers. In order to make striking the effects as the non-impregnated type substrate, however, it is preferable that the matrix fibers are a combination of the highly shrinkable fibers and the self-extensible fibers. Particularly, it is desirable to use the matrix fibers in which highly shrinkable fibers and self-extensible fibers are mixed in a blending ratio of 50:50 to 100:0, particularly 70:30 to 90:10, by weight ratio.

The non-impregnated substrate of the present invention is preferably a laminate of at least two layers of non-woven fabrics different in blending ratio of matrix fibers to binder fibers.

By allowing the substrate to have such a laminate form and contain heat-bonded spots so as to have a gradient in the thickness direction, the substrate can have, for example, a structure of dense face side and sparse back side such as possessed by natural leather and accordingly, can have handle very close to that of natural leather.

Further, in the substrate of a laminate form, the blending ratios of binder fibers between two adjacent non-woven fabric layers preferably satisfy the following general formula (I).

$$10 \leq |W1-W2| \leq 30 \qquad (I)$$

[wherein W1 and W2 are each the blending ratio (wt. %) of binder fibers in each of two adjacent non-woven fabric layers].

When |W1−W2| is smaller than 10, the effect produced by lamination is small. On the other hand, when |W1−W2| is larger than 30, the difference in physical properties between two adjacent non-woven fabric layers is large and the resulting substrate has undesirable handle.

Further, in the substrate of laminate form, the blending ratios of the matrix fibers between two adjacent non-woven fabric layers preferably satisfy the following general formula (II).

$$0 \leq |M1-M2| \leq 40 \qquad (II)$$

[wherein M1 and M2 are each the blending ratio (wt. %) of highly shrinkable fibers in the matrix fibers of each of two adjacent non-woven fabric layers].

When |M1−M2| is larger than 40, the adjacent non-woven fabrics differ in shrinkage and tanglement, and the resulting substrate has undesirable handle.

The non-impregnated type substrate of the present invention preferably has a 20%-elongation recovery ranging from 50 to 90% in each of any two axes perpendicularly intersecting each other, present on any plane perpendicularly intersecting the thickness direction of the substrate. Here, the "range of from 50 to 90% in each of any two axes" implies that the non-impregnated type substrate has low anisotropy in the above elongation recovery in any plane perpendicularly intersecting the thickness direction.

The non-impregnated type substrate of the present invention preferably has a bending resistance, measured by the Cantilever method, of 2 to 20 cm, in each of any two axes perpendicularly intersecting each other, present on any plane perpendicularly intersecting the thickness direction of the substrate. Here, that the bending resistance is within the range of from 2 to 20 cm in each of any two axes implies that the non-impregnated type substrate has low anisotropy in the above bending resistance in any plane perpendicularly intersecting the thickness direction. The bending resistance is more preferably 2 to 15 cm.

The non-impregnated type substrate of the present invention preferably has an air permeability in the thickness direction, of 10 to 100 $cm^3/cm^2/sec$. When the air permeability is smaller than 10 $cm^3/cm^2/sec$, the substrate has an insufficient air permeability. On the other hand, when the air permeability exceeds 100 $cm^3/cm^2/sec$, the substrate has a sparse structure, which is not preferable.

The non-impregnated type substrate of the present invention preferably has a porosity of 65 to 90%. Herein, the porosity is represented by the following general formula (III)

$$\text{Porosity}(\%)=[1-(\text{substrate density})/(\text{short fiber density})]\times 100 \qquad (III)$$

When the porosity is smaller than 65%, the substrate is insufficient in air permeability. On the other hand, when the porosity is larger than 90%, the substrate has a sparse structure, which is not preferable.

The non-impregnated type substrate of the present invention can be converted into a base fabric for artificial leather, by forming an elastomer layer on the surface of the substrate. In the base fabric, the elastomer layer has preferably a uniform porous structure and/or is a uniform globular aggregation. Because of the structure taken by the elastomer layer, the base fabric can have improved porosity and, as a result, can show soft handle and flexibility.

Figure 11:
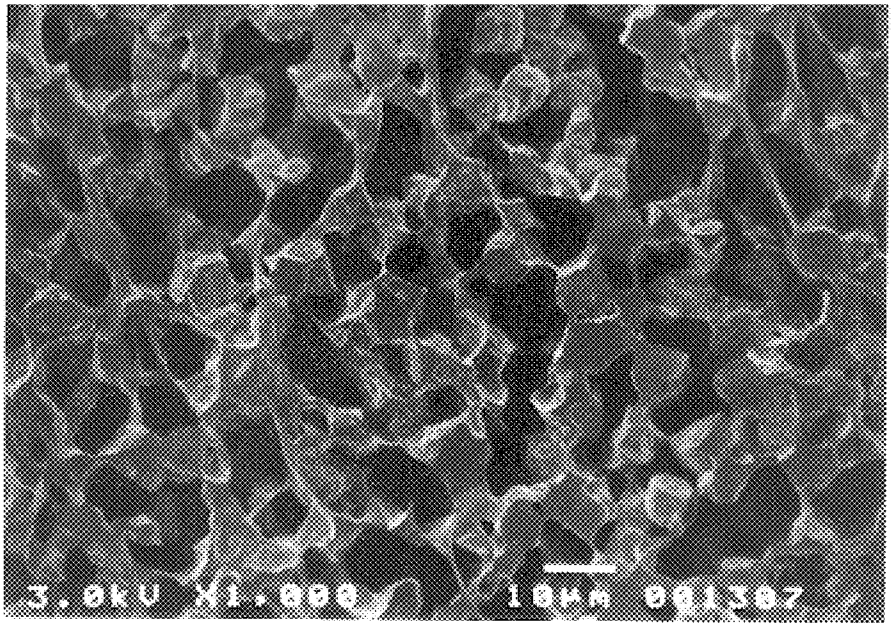
Figure 12:
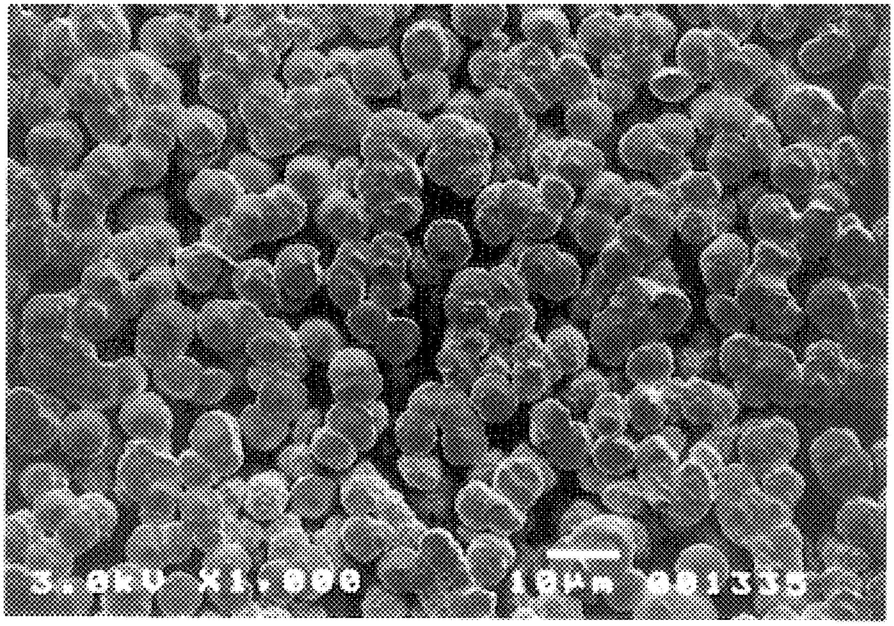

Herein, the "porous structure" refers to a structure as shown in FIG. 11, in any cross section obtained when the surface layer is cut parallel to the thickness direction. The "globular aggregation" refers to a structure as shown in FIG. 12, in any cross section obtained when the surface layer is cut parallel to the thickness direction.

The elastomer layer may be formed of a polyester elastomer or a polyurethane elastomer, with the former being most preferred because it generates no harmful gas when incinerated.

The polyester elastomer preferably contains, as the hard segments, a crystalline polyester whose main acid component is an aromatic dicarboxylic acid and, as the soft segments, at least one polymer selected from the group consisting of polyethers, low-crystalline polyesters and non-crystalline polyesters.

In producing the non-impregnated type substrate of the present invention, when non-woven fabrics are subjected to thermoforming so as to satisfy the requirements (a) to (e) described previously with reference to the accompanying drawings and photographs to obtain the substrate, the production process must comprise steps (f) and (g) successively. That is, in the step (f), it is desirable to subject a web to a forced tanglement treatment to orient the fibers of the web parallel or semi-parallel to the thickness direction of the web and desirably, further to subject the resulting web to a shrinkage treatment. Herein, "semi-parallel" refers to that the fibers are oriented at an angle of less than 45° to the thickness direction of the web. By orienting the fibers as above, the substrate obtained can have higher air permeability in the thickness direction and moreover, can be bent flexibly like, for example, an accordion. By subjecting the web to the shrinkage treatment, the web can be made into a substrate of dense structure having higher toughness and full and tight handle such as possessed by leather.

The shrinkage treatment is preferably conducted so as to give an area shrinkage of 20 to 70%. When the area shrinkage is smaller than 20%, the structure of entangled fibers in web tends to be sparse, the durability of web in strength, etc. is low, and the substrate obtained is difficult to have satisfactory tightness. On the other hand, when the area shrinkage is larger than 70%, the web has a high apparent density and the substrate obtained can not be made to be light in weight and tends to have insufficient flexibility. While the shrinkage treatment can be appropriately conducted, for example, in hot water or in dry heat, the shrinkage treatment in hot water is preferred because if heating is uniformly applied, more wrinkles tend to be formed. The temperature during the shrinkage treatment is appropriately 65 to 75° C. in the treatment in hot water and 100 to 150° C. in the treatment in dry heat. The time of heating can be appropriately determined so that the resulting web can have a desired level of area shrinkage.

In the step (g), the non-woven fabric obtained in the above step (f) is subjected to a heating treatment under pressure at the adhesion temperature of binder fibers. Herein, the "adhesion temperature" of binder fibers refers to a temperature which is at least equal to the melting point of a binder component (elastic polymer) but lower than the decomposition temperature of the component. By the heating treatment under pressure, each fiber in substrate is easily compressed under pressure, whereby a substrate having increased dense structure can be produced. This heating treatment under pressure makes at least part of the points, at which the elastic polymers contained in the binder fibers are in contact with each other, to be heat-bonded thereby to form a network structure in the non-woven fabric. By formation of this network structure, even the non-impregnated type substrate which is low in elastic polymer content can easily have resistance to deterioration in toughness and the like, which is comparable to that of impregnation type substrates.

The heating treatment under pressure can be conducted under various conditions depending upon the application and the purpose of substrate, etc. However, it is preferable that there is a clearance to some extent in order to obtain bulky handle. The clearance is set preferably within a range of from 60 to 90% based on the substrate thickness before the heating treatment under pressure. For this purpose, there is employed, for example, a method in which the non-woven fabric obtained in the step (f) is treated using a pair of heated rollers, or a method in which the fabric is treated using a hot press. The pressure applied therefor is preferably 10 to 1,500 kg/cm in terms of line pressure. When the line pressure is in this range, there can be obtained a substrate having compliant tightness such as possessed by leather, appropriate apparent density, lightness properties and air permeability, all necessary in artificial leather application.

In the production process of the present invention, it is necessary that at any step prior to the step (g), to the surfaces of part of the matrix fibers is applied such a treatment that heat-bonding between fibers is hindered at part of the crossing points between the matrix fibers and binder fibers.

By applying such a treatment, there can be obtained, after the heating treatment under pressure, a non-impregnated type substrate with flexibility and compliant tightness, having wholly heat-bonded portions and partially heat-bonded portions in the internal structure. As a preferable example of the treatment for hindering heat-bonding, there can be mentioned a method which comprises adhering a releasing agent to the surfaces of part of the matrix fibers. This method is preferable in view of the cost, etc. Besides, there may also be used, for example, a method which comprises destroying heat-bonded portions mechanically after the heating step under pressure, or a method in which the binder polymers and the matrix polymer are selected so that they are not compatible with each other. The adhesion of a releasing agent can be conducted, for example, by immersing a substrate in a releasing agent aqueous solution and controlling the amount of releasing agent to be adhered using a mangle, or by beforehand adhering a releasing agent to part or entire of the matrix fibers to be used.

In the production process of the present invention, it is preferable that in the step (f), at least two webs different in blending ratio of binder fibers are laminated, and the laminate is subjected to a forced tanglement treatment and a shrinkage treatment. By laminating webs different in blending ratio of binder fibers, there can be obtained a structure which is dense in the face side and sparse in the back side, such as possessed by natural leather, and consequently, the substrate can have handle closer to that of natural leather. The above lamination is preferable because it allows to assure the uniform heating over the whole laminate portion as compared with a method which comprises letting a web pass through a pair of rollers consisting of a not-heated roller and a heated roller. Thus, wholly heat-bonded portions and partially heat-bonded portions can be formed in the substrate without fail.

The matrix fibers used in the present production process preferably has a birefringence of 0.02 to 0.14 and a crystallinity of 10 to 35%, after having been treated for 5 minutes in dry heat at 200° C. When the birefringence is smaller than 0.02, the matrix fibers have an insufficient strength, while when the birefringence is larger than 0.14, the matrix fibers are stiff. When the crystallinity is lower than 10%, the matrix fibers have too high an elastic modulus. On the other hand, when the crystallinity is higher than 35%, the matrix fibers have low elongation and gives a stiff substrate.

The matrix fibers used in the present production process preferably contain highly shrinkable short fibers having a shrinkage of 20 to 70% after having been kept in hot water of 70° C. for one minute and an elongation of 5 to 50% after having been kept in the above state and further treated in dry heat at 180° C. for one minute. Dispersion of such highly shrinkable short fibers in non-woven fabric makes it easy to conduct a shrinkage treatment uniformly with no generation of wrinkles.

Such highly shrinkable fibers can be obtained by the known method per se, for example, by melt spinning and subsequently drawing fibers at a temperature not lower than the glass transition temperature but not higher than the crystallization temperature of the fiber. More specifically, the highly shrinkable fibers can be obtained, for example, by subjecting a polyethylene terephthalate to melt spinning, then drawing the resulting fibers at a draw ratio of 2.4 to 2.7 times in hot water of 60 to 65° C. and drying the drawn fibers at a temperature of 65° C. or lower.

The matrix fibers used in the present production process preferably contain self-extensible short fibers which cause substantially no shrinkage in hot water of 70° C. and which have an elongation of 5 to 50% after having been treated in dry heat at 180° C. for one minute. Dispersion of such self-extensible fibers in non-woven fabric makes better the tanglement between fibers present in web when the web is subjected to a shrinkage treatment.

The self-extensible fibers can be obtained by the known method per se. Specifically, they can be obtained by melt-spinning a polyester such as polyethylene terephthalate or polybutylene terephthalate or a copolyester obtained by copolymerizing these polyesters with other aromatic or aliphatic dicarboxylic acid component or glycol component, drawing the resulting fiber at a draw ratio of 2 to 4 times in hot water of 60 to 65° C., heat-treating the drawn fiber in hot water of 85 to 95° C., and drying the resulting fiber at a temperature of not higher than 100° C.

In the present invention, one surface of the substrate can be subjected to embossing by a heating treatment under pressure, whereby the substrate can have, at the surface, a large number of convex portions and concave portions and can have heat-bonded portions having regular density distribution relative to the planar direction. The embossed substrate can have a structure of leather-like wavy density gradient which has not existed heretofore, and can achieve higher adhesion with a surface layer. The artificial leather obtained from such a substrate has flexible, full and tight handle such as possessed by leather and is superior in peeling strength.

By subjecting the substrate (web) to a heating treatment under pressure using an embossing roll with a pattern having convex portions and concave portions, the heat-bonded portions are regularly distributed in the substrate. Due to partial different in pressures to the substrate which are produced by the convex portions and concave portions of the embossing roll, the concave portions in the thickness direction of the substrate surface have more heat-bonded portions than the convex portions in the thickness direction of the substrate surface. The proportion per unit volume of the heat-bonded portions of the concave portions in the thickness direction of the substrate surface and those of the convex portions in the thickness direction is preferably (concave portions): (convex portions) being 50:50 to 67:33.

The pattern of the embossing roll has no particular restriction as long as it is a regular pattern, while the areal ratio of concave portions and convex portions is preferably (concave portions): (convex portions) being 5:95 to 95:5. When the areal ratio is outside this range, the above effect given to the substrate by the embossing roll is small. The length in the thickness direction of from its concave portions to the convex portions in the embossing roll is preferably 3 to 50% of the thickness of the substrate.

When the length is smaller than 3%, the above effect imparted to the substrate by the embossing roll is small. When the length is larger than 50%, the substrate tends to have buckling.

The temperature in embossing is not lower than the melting point but lower than the decomposition temperature of the binder fibers. At this time, the pressure in embossing is preferably 5 to 500 kg/cm. When the pressure is smaller than 5 kg/cm, the effect of the embossing roll is small. When the pressure is larger than 500 kg/cm, undesirably, the substrate has a high bulk density and hard handle.

In the introduction of embossing, a web to become a substrate is subjected to a heating treatment at a temperature not lower than the melting point of the binder fibers, using an embossing roll. The means for embossing includes a hot roll, a hot press and the like and is not particularly restricted. When a hot roll is used, it is preferable to conduct a preheating treatment right before embossing. The temperature of heat-bonding differs depending upon the pressure applied, but is preferably a temperature lower than the melting points of the polymers constituting the web but higher than the melting point of the heat-bonding polymer by 5 to 50° C. In the heat-bonding, a certain clearance is required in order to obtain bulky handle. The clearance differs depending upon the pressure applied but is preferably 50 to 95% of the thickness of substrate.

Next, a surface layer is formed on the substrate obtained above by a known method. The method will be described later, and it includes a wet method and a lamination method. The wet method is preferred to obtain higher adhesion. Since the substrate subjected to embossing can retain the embossing pattern even after the coating of a surface layer, the conventionally employed two steps of heating and embossing can be integrated into one step by using an embossing pattern having a leather-like surface pattern at the time of heat-bonding, which is advantageous.

Conversion of the non-impregnated type substrate of the present invention into an artificial leather can be conducted by the known process per se for producing an artificial leather from a substrate. The substrate is subjected to a finishing treatment such as surface smoothening, formation of surface coat layer and the like. The surface coating layer preferably consists of an elastomer.

In the process for producing an artificial leather by forming a coating layer on the surface of the above-mentioned substrate of the present invention, when the coating layer is formed of, for example, a polyester elastomer, there is used a solution composition of a water-soluble polyester elastomer in a polar solvent incapable of dissolving the elastomer at a particular temperature or lower. The polar solvent is desirably selected from solvents satisfying the following three requirements, i.e. (1) it being miscible with water, (2) it being capable of dissolving the polyester elastomer used, by heating or the like, and (3) it being capable of allowing the solution composition to cause phase separation thereby to give rise to gelation and whitening when the solution composition containing the water-soluble polyester elastomer is cooled to a particular temperature or lower.

Examples of such a polar solvent include N-methylpyrrolidone (hereinafter abbreviated to NMP, in some cases), N,N-dimethylformamide (hereinafter abbreviated to DMF, in some cases) and N,N-dimethylacetamide. Of these, preferred are N-methylpyrrolidone and N,N-dimethylformamide. DMF, for example, is incapable of dissolving the polyester elastomer in the vicinity of 20° C. to form a 25 wt. % solution but, when heated to 120° C., can dissolve the elastomer uniformly. The resulting solution, when cast on the present substrate and cooled, soon causes gelation and whitening.

The polar solvent may be used singly or in combination of two or more kinds. The polar solvent may be mixed with other solvents, inorganic salts, additives, etc. as long as the above-mentioned properties of the polar solvent are not impaired.

The concentration of the polyester elastomer in the solution composition is preferably Within a range of from 1 to 50% based on the total weight of the solution composition.

When the concentration of the elastomer is lower than 1%, the resulting surface layer hardly has a film-like or sheet-like form. When the concentration exceeds 50%, the resulting surface layer has too low a porosity and in consequence, has no flexibility. The polyester elastomer concentration is more preferably 3 to 35% by weight.

The temperature at which the polyester elastomer is heated to be dissolved in a polar solvent differs depending upon the molecular structure or concentration of polyester elastomer, the kind of polar solvent, etc. While it may be a temperature necessary for uniformly dissolving the polyester elastomer in the polar solvent, the temperature is generally from the dissolution initiating temperature to 200° C., preferably 50 to 150° C.

According to the present process for production of artificial leather, a liquid material cast on the substrate is then cooled, is allowed to cause gelation by phase separation, and becomes a film-like material. In the present invention, the "gelation" refers to a state that the transparent solution composition in which polyester elastomer solution is dissolved homogeneously gets cloudy in a white color and yet retains a liquid form. The cooling method and the cooling temperature for causing geletion are not particularly restricted, but cooling is preferably completed usually within 5 hours, particularly within 2 hours. Cooling may be conducted by standing at room temperature or by ice-cooling or by using a cooling apparatus.

By causing gelation, an internal structure of the film-like material obtained becomes a porous structure and/or a globular aggregation. Because of this internal structure, the elastomer surface layer becomes uniform and in consequence, has good air permeability. If extraction is conducted directly without giving rise to gelation, no uniform structure is formed in the thickness direction, i.e. in the surface layer portion and the substrate portion, resulting in inferior air permeability.

The film-like material obtained as above is then subjected to extraction with an aqueous solvent to extract the polar solvent. In the present invention, the "aqueous solvent" refers to water or an aqueous solution containing at least one member of inorganic salts, lower aliphatic alcohols, polar solvents or the like, dissolved therein. The temperature of the aqueous solvent used is not particularly restricted, while it can be generally 0 to 100° C., preferably 5 to 80° C. The method of extraction is not particularly restricted, while there can be used, for example, a method which comprises immersing the film-like material gelled on the substrate directly in an aqueous solvent or washing the material with an aqueous solvent. The time required for extraction differs depending upon the method of extraction used, but is usually within 5 hours, preferably within 3 hours.

The resulting film-like material is dried and ultimately becomes a polyester elastomer surface layer having a thickness of about several microns to about 1 mm. The drying temperature can be any temperature not higher than the melting point of the polyester elastomer. The drying can be conducted at normal pressure or under reduced pressure. The drying temperature is usually 150° C. or lower, preferably 130° C. or lower.

The structure and properties of the polyester elastomer surface layer of the artificial leather provided by the present invention are influenced by the material used in the surface layer and the production process of the surface layer. For example, the density of the layer is influenced by the polyester elastomer concentration in the solution composition, while it is preferred that the porosity of the polyester elastomer surface layer is within a range of from 20 to 80% and the core diameter of the porous structure or the globular aggregation is within a range of from 0.1 to 5.0 $\mu$m. When the porosity of the surface layer is smaller than 20%, the surface layer is inferior in air permeability and becomes a film-like material, resulting in inferior handle such as flexibility. On the other hand, when the porosity is higher than 80%, the surface layer has too sparse a structure, resulting in inferior durability.

When a coating layer formed of an urethane elastomer is provided on the surface of the non-impregnated type substrate, any known polyurethane can be used, and the coating layer can be formed by any known process. For example, there can be employed a process which comprises coating an organic solvent solution of a polyurethane on the non-impregnated type substrate and placing the coated material in a coagulating bath of a solvent which is a non-solvent to polyurethane and which is miscible with the organic solvent in the above solution, to give rise to coagulation of polyurethane; or a process which comprises coating, on the non-impregnated type substrate, a W/O type emulsion obtained by finely dispersing water into a solution or dispersion of polyurethane in an organic solvent, and then selectively evaporating the organic solvent to give rise to coagulation of polyurethane. In order to achieve a surface structure of good air permeability, the resulting porous polyurethane layer having communicated fine pores is preferably of continuous porousness.

That is, the air permeability of the communicated porous polyurethane layer is preferably secured by communicating pores extending from the not-coated surface of the non-impregnated type substrate to the coated layer surface. Such a porous polyurethane layer can be obtained by any method appropriately selected from a method in which a porosity-controlling agent (a coagulation-controlling agent) is used in the formation of a porous polyurethane layer; a method comprising applying, prior to forming the finish polyurethane surface film, a mixture solution consisting of a polyurethane and any of a good solvent (to the polyurethane), a poor solvent (to the polyurethane), a mixture solvent of a good solvent and a poor solvent, or a mixture solvent of a good solvent and a non-solvent, onto the porous polyurethane layer so as to form a large number of scattered dots, and then forming thereon a finish polyurethane film; and the like.

For production of the artificial leather of the present invention, there can also be mentioned a process which comprises first forming a film-like material only from an elastomer and then, adhering the material to a non-impregnated type substrate using a heat-melt type adhesive which melts at a temperature not higher than the melting points of the above elastomer and the elastic polymer constituting the binder component present in the non-impregnated type substrate. This process of applying a film-like material directly onto a substrate is preferable because the formed surface layer can have an improved peeling strength.

[Function]

As the technique similar in constitution to the present invention there can be given Japanese Laid-Open Patent Publication No. 52-87201. This publication proposes a process for production of a leather-like sheet material, which comprises forming a sheet-like material from binder fibers and matrix fibers and subjecting the sheet-like material to a heating treatment under pressure to make dense the surface layer of the sheet-like material.

That is, the publication describes that the surface of the sheet-like material is subjected to a heating treatment under pressure by the use of a hot roller or the like to make the surface dense. When the obtained sheet-like material is used as a substrate for artificial leather, however, the artificial leather having flexible and soft handle peculiar to natural leather can not be provided and it has rubber-like handle, though its surface layer can have necessary appearance, touch or the like.

In the present invention, an eye was given particularly to the internal structure of the substrate, and elongation recovery performance and flexible and soft handle, both necessary for artificial leather, have been achieved by allowing wholly heat-bonded portions and partially heat-bonded portions in a specified ratio to exist in a mixed state at the crossing points between binder fibers and matrix fibers to cause the wholly heat-bonded portions to be present in the substrate in a scattered state.

[Effects]

The non-impregnated type substrate of the present invention is excellent in air permeability and lightness properties and has leather-like handle.

Further, the process for production of the substrate is relatively easy to carry out, and is advantageous from the standpoint of environmental aspect because no solvent is used and no cyan gas is generated in incineration owing to no use of polyurethane.

Further, since a novel non-impregnated type substrate is used in the artificial leather produced by forming an elastomer layer on the surface of the non-impregnated type substrate of the present invention, when applied to, for example, sports shoes, etc., it provides shoes having lightness properties, less stuffiness feeling and fitness to body.

EXAMPLES

The present invention is hereinafter described in more detail by way of Examples. However, the present invention is in no way restricted by the Examples.

Various values in the Examples were measured by the following methods.

1. Measurement of Inherent Viscosity of Polyester Elastomer

The inherent viscosity of polyester elastomer was measured at 35° C. using a mixed solvent containing phenol and tetrachloroethane in an equal amount.

2. Measurement of Melting Point

Measurement was made at an temperature elevation rate of 20° C./min using a differential scanning calorimeter (DSC) Model 990 manufactured by DuPont. Peak temperature of melting was taken as a melting point.

3. Measurement of Softening Point

A micro melting point apparatus manufactured by Yanagimoto Seisakusho was used. A polymer of about 3 g was held between two cover-glass sheets. While the glass sheets were lightly pressed by a pincette, they were heated at a temperature elevation rate of about 10° C./min to observe the thermal change of the polymer. The temperature at which the polymer softened and began to flow was taken as a softening point of the polymer.

4. Measurement of Melt-viscosity

An elastomer was measured for apparent melt-viscosity in a shear rate ranging from 10 to 10,000 $sec^{-1}$ at a temperature of the heat treatment. Using a calibration curve, the melt viscosity of the elastomer at a shear rate of 1,000 $sec^{-1}$ was determined.

5. Shrinkage and Elongation of Fiber and Substrate (I) Shrinkage and Elongation of Fiber Calculated using the following formulas (3) and (4).

$$\text{Shrinkage (\%) of fiber} = [1 - (\text{length of shrunken fiber}) / (\text{length of fiber before shrinkage})] \times 100 \quad (3)$$

$$\text{Elongation (\%) of fiber} = [(\text{length of elongated fiber}) / (\text{length of fiber before elongation}) - 1] \times 100 \quad (4)$$

(II) Shrinkage of Substrate

Calculated using the following formula (5).

$$\text{Shrinkage (\%) of substrate} = [1 - (\text{area of shrunken subtrate}) / (\text{area of subtrate before shrinkage})] \times 100 \quad (5)$$

6. Ratio of Number of Wholly Heat-bonded Portions and Number of Partially Heat-Bonded Portions A sample substrate was cut so as to expose a cross section, and any portion of the cross section was photographed with an electron microscope to prepare an electron micrograph of 350 magnification (the electron micrograph had almost the same size as those of FIGS. 5 to 8; the same applies hereinafter). The number of wholly heat-bonded portions and the number of partially heat-bonded portions, both being contained in the electron micrograph, were counted visually, and their ratio was calculated. Ten electron micrographs were prepared for one substrate, and an average thereof was obtained.

7. Ratio of Total Number of Wholly Heat-bonded Portions and Partially Heat-Bonded Portions and Number of Elastic Heat-bonded Spots A sample substrate was cut so as to expose a cross section, and any portion of the cross section was photographed with an electron microscope to prepare an electron micrograph of 350 magnification. The number of wholly heat-bonded portions and the number of partially heat-bonded portions, both being contained in the electron micrograph, were counted visually, and their ratio was calculated. Ten electron micrographs were prepared for one substrate, and an average thereof was obtained.

8. 20%-elongation Recovery of Substrate

A substrate was pulled at a pulling speed of 50 mm/min so that the length after pulling became 120% of the original length, then, the substrate was returned to the original point at a return speed of 50 mm/min and allowed to stand for 2 minutes; and thereafter, the substrate was again pulled at a pulling speed of 50 mm/min. From the initial rise of stress and the rise of stress after standing (under stress of 2 g) was determined a relaxation length (mm) of the sample. Using this length of relaxation was calculated a percentage relative to elongation amount (150 mm) from the following equation (6) to take the percentage as a 120%-elongation recovery of the substrate.

Here, the measurement of the above elongation recovery was conducted in each of any two axes (referred to as A axis and B axis) perpendicularly intersecting each other, present on any plane perpendicularly intersecting the thickness direction of the substrate.

$$\text{120\%-elongation recovery (\%)} = [1 - (\text{relaxation length}) / 150] \times 100 \quad (6)$$

9. Bending Resistance of Substrate

Measured by the "45° Cantilever" method specified in JIS L 1096, in each of any two axes (A axis and B axis) perpendicularly intersecting each other, present on any plane perpendicularly intersecting the thickness direction of a substrate.

10. Air Permeability in Thickness Direction of Substrate

Measured by the use of an air permeability tester, FX 3300 (manufactured by TEXTEST AG, Switzerland), using an orifice of 100 $cm^2$ at a pressure difference of 124 Pa.

11. Handle of Substrate

A substrate produced was subjected to an organoleptic test (a comparative test by touch) by randomly selected five experienced examiners. The evaluations given in Table 1 are based on the following criteria.

◎: Has compliant tightness and flexibility such as possessed by leather and is different in tightness and flexibility between face side and back side of base fabric, like leather.

○: Has compliant tightness and flexibility such as possessed by leather.

X: Is lacking in compliant tightness and flexibility such as possessed by leather.

12. Anti-buckling

An artificial leather of 20 cm×20 cm was bent at a curvature of about 5 mm and while the bent portion was nipped by fingertips, the bent portion was gradually moved; and the roundness of the bent portion was examined.

○: The bent portion is round and is not angular.

Δ: The bent portion is slightly angular.

X: The bent portion is angular.

Referential Example 1

(Production of Binder Fibers)

Dimethyl terephthalate (hereinafter abbreviated to DMT, in some cases), isophthalate (hereinafter abbreviated to IA, in some cases), tetramethylene glycol (hereinafter abbreviated to TMG, in some cases) and polytetramethylene glycol (hereinafter abbreviated to PTMG, in some cases) were subjected to polycondensation to obtain a polyether polyester block copolyelastomer. The proportions of the individual monomers used were DMT:IA being 85:15 in terms of molar ratio based on the whole acid component, TMG being 1.45 times in terms of molar ratio based on the whole acid component, and PTMG being 55% based on the total weight of the elastomer. Here, IA was used in a slurry state and PTMG having a number-average molecular weight of 2,000 was used. The thermoplastic elastomer obtained had an inherent viscosity of 1.0 dl/g, a melting point of 172° C., an elongation at break of 1,420%, a 300%-elongation stress of 0.3 kg/mm$^2$, a 300%-elongation recovery of 73% and a 50%-elongation recovery of 81%.

The thermoplastic elastomer as the core and a polybutylene terephthalate (a non-elastic polymer having a melting point of 224° C., an inherent viscosity of 0.875 dl/g and a 50%-elongation recovery of 0%) as the sheath were conjugated by a commonly used spinning method so as to have a weight ratio of the core portion: the sheath portion being 50:50, based on the entire fibers. The obtained conjugated fibers were eccentric sheath-core type conjugated fibers. The fibers were drawn at a draw ratio of 2.0 times, subjected to a stuff crimping and cut into lengths of 64 mm, and after dry treatment, a textile oil was applied to the fibers. The binder fibers obtained had a size of 9 deniers.

Referential Example 2

(Production of Matrix Fibers)

Non-elastic highly shrinkable fibers formed of a polyethylene terephthalate were used.

The non-elastic highly shrinkable short fibers had a birefringence of 0.089 and a crystallinity of 0.29, after having been subjected to a dry-heat treatment of 200° C. for 5 minutes. Further, the short fibers had a shrinkage of 45% after having been immersed in hot water of 70° C. for one minute, and a 50% elastic recovery of 0%.

Referential Example 3

(Production of Polyurethane-impregnated Substrate)

A non-woven fabric (weight per unit area=300 g/m$^2$, thickness=1.0 mm) formed of polyester short fibers was impregnated with a dimethylformamide solution containing 13% of a polyurethane, to produce a polyurethane-impregnated substrate. The results are shown in Table 1.

Example 1

The binder fibers obtained in Referential Example 1 and the matrix fibers obtained in Referential Example 2 were mixed in an amount of 25% by weight and 75% by weight, respectively. The mixture was passed through a carding machine and then, subjected to a cross-laying method to produce a web. The web was subjected to a forced tanglement treatment using a needle punch (1,000 punches/cm$^2$) and then, to a shrinkage treatment in a hot water of 70° C. for one minute. The resulting web was squeezed with a mangle. The resulting substrate was passed through an aqueous solution containing 0.27% by weight of a silicone (Polon-MNK, a product of Shin-Etsu Chemical Co., Ltd.), and then squeezed with a mangle with a certain clearance left so that the water content after squeezing became 200% by weight. The amount of the silicone adhered to the matrix fibers of the substrate was 0.5% by weight. Thereafter, drying was conducted in an atmosphere of 120° C. The area shrinkage was 40%. Next, preheating was conducted in an atmosphere of 170° C. for 3 minutes and then immediately, a heat-bonding treatment was conducted at 200° C. using a calender roll. The resulting substrate had leather-like flexibility and compliant tightness. The physical properties of the substrate are shown in Table 1.

Examples 2 and 3

An operation was conducted in the same manner as in Example 1 except that the blending ratio of the binder fibers and the matrix fibers was changed. The results are shown in Table 1.

Example 4

The blending ratio of binder fibers and matrix fibers, used in Example 1 was changed as shown in Table 1, and web A and web B different in said blending ratio were produced. The two webs were laminated to form a laminate. The laminate was subjected to the same operation as in Example 1, to obtain a substrate. The results are shown in Table 1. The obtained substrate had more leather-like flexibility and tightness. In this case, the blending ratios of the binder fibers and the binder fibers between laminated, adjacent non-woven fabrics satisfied the following general formulas (I) and (II).

$$10 \leqq |W1-W2| 30 \quad (I)$$

[wherein W1 and W2 are each the blending ratio (wt. %) of matrix fibers in each of the adjacent non-woven fabrics].

$$0 \leqq |M1-M2 \leqq 40 \quad (II)$$

[wherein M1 and M2 are each the blending ratio (wt. %) of highly shrinkable fibers in the matrix fibers of each of the adjacent non-woven fabrics].

Example 5

The blending ratio of binder fibers and matrix fibers, used in Example 1 was changed as shown in Table 1, and web C, web D and web E different in said blending ratio were produced. The three webs were laminated to form a laminate. The laminate was subjected to the same operation as in Example 1, to obtain a substrate. The results are shown in Table 1. The obtained substrate had leather-like flexibility and tightness more than the substrate obtained in Example 4.

In this case, the blending ratios of the binder fibers and the matrix fibers between laminated, adjacent non-woven fabrics satisfied the following general formulas (I) and (II).

$$10 \leqq |W1-W2| \leqq 30 \quad (I)$$

[wherein W1 and W2 are each the blending ratio (wt. %) of binder fibers in each of the adjacent non-woven fabrics].

$$0 \leqq |M1-M2| \leqq 40 \quad (II)$$

[wherein M1 and M2 are each the blending ratio (wt. %) of highly shrinkable fibers in the matrix fibers of each of the adjacent non-woven fabrics].

Comparative Example 1

A non-impregnated type substrate was obtained in the same manner as in Example 1 except that passing of substrate through aqueous silicone solution was not conducted. The substrate had rubber-like handle, and was not suitable for use as a base fabric for leather. The results are shown in Table 1.

Comparative Examples 2 and 3

Substrates were obtained in the same manner as in Example 1 except that the density of the substrate was changed as shown in Table 1. The results are shown in Table 1.

Comparative Example 4

A substrate was obtained in the same manner as in Example 1 except that the proportion of elastic polymer in the substrate was changed as shown in Table 1. The results are shown in Table 1.

compliant tightness. The physical properties of the substrate obtained are shown in Table 2. The artificial leather was excellent in both light resistance (○) and handle.

Example 7

A polyester ether elastomer having a melting point of 174° C., in which polybutylene terephthalate as the hard segment component occupied 50% of the total weight of the hard segment components of the elastomer and polyoxytetramethylene glycol as the soft segment component occupied 50% of the soft segment components of the elastomer was dissolved in DMF at 125° C. at a weight ratio of elastomer:DMF being 20:80.

Surface coating was conducted in the same manner as in Example 6 except that the above solution was used. The resulting surface coating layer was a polyester elastomer layer of globular aggregation having a white color, good surface uniformity and a porosity of 45%.

Artificial leather made of the thus-obtained non-impregnated type substrate had leather-like flexibility and compliant tightness, similarly to the artificial leather obtained in Example 6.

TABLE 1

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Ref. Ex. 3 |
|---|---|---|---|---|---|---|---|---|---|---|
| Proportion of elastic polymer (wt. %) | 10 | 5 | 15 | 10 | 10 | 10 | 10 | 10 | 10 | 40 |
| Wholly heat-bonded portions: partially heat-bonded portions (%) | 65:35 | 70:30 | 65:35 | 70:30 | 68:32 | 86:14 | 66:34 | 64:36 | 55:45 | — |
| (Wholly heat-bonded portions + partially heat - bonded portions): elastic heat-bonded spots (%) | 74:26 | 74:26 | 71:29 | 70:30 | 68:32 | 80:20 | 70:30 | 71:29 | 80:20 | — |
| Density (g/cm$^3$) | 0.28 | 0.28 | 0.29 | 0.28 | 0.28 | 0.28 | 0.14 | 0.50 | 0.28 | 0.40 |
| Weight per unit area, of substrate (g/m$^2$) | 300 | 300 | 300 | 300 | 300 | 300 | 300 | 300 | 300 | 450 |
| Matrix: binder (%) | 80:20 | 90:10 | 70:30 | 80:20 | 80:20 | 80:20 | 80:20 | 80:20 | 80:20 | 60:40 |
| Amount of releasing agent adhered (wt. %) | 1.0 | 1.0 | 1.0 | 1.0 | 1.0 | 0.0 | 1.0 | 1.0 | 5.0 | 0.3 |
| 20%-Elongation recovery (%) (A axis/B axis) | 80/80 | 74/74 | 82/82 | 80/80 | 80/80 | 80/80 | 76/76 | 79/79 | 77/77 | 70/70 |
| Bending resistance (cm) (A axis/B axis) | 10/9 | 9/9 | 12/12 | 12/12 | 12/12 | 16/16 | 9/9 | 16/16 | 7/6 | 16/16 |
| Air permeability (cm$^3$/cm$^2$/sec at 125 pa) | 28 | 34 | 25 | 28 | 25 | 30 | 50 | 12 | 25 | 0 |
| Tensile strength (kg/cm) | 5.0 | 4.5 | 6.0 | 5.5 | 5.0 | 9.0 | 4.0 | 7.0 | 3.5 | 10.0 |
| Handle | ○ | ○ | ○ | ◎ | ◎ | X | X | X | ○ | ○ |
| W1 | — | — | — | 10 | 20 | — | — | — | — | — |
| W2 | — | — | — | 30 | 10 | — | — | — | — | — |
| W2' | — | — | — | — | 30 | — | — | — | — | — |
| M1 | — | — | — | 90 | 80 | — | — | — | — | — |
| M2 | — | — | — | 70 | 90 | — | — | — | — | — |
| M2' | — | — | — | — | 70 | — | — | — | — | — |

Ex.: Example; Comp. Ex.: Comparative Example; Ref. Ex.; Referential Example

As is apparent from Table 1, when Examples and Comparative Examples 1 and 2 in the present invention are compared, elongation recovery and bending resistance are good in all of Examples 1 to 5. On the other hand, the non-impregnated type substrate of Comparative Example 1 has high air permeability, but has inferior handle and cannot be used as a base fabric for artificial leather. The polyurethane-impregnated substrate of Referential Example 3 is good in elongation recovery and bending resistance, but inferior in air permeability.

Example 6

A polyester ether elastomer having a melting point of 150° C., in which polybutylene terephthalate as the hard segment component occupied 70% of the total weight of the hard segment components of the elastomer and polyoxytetramethylene glycol as the soft segment component occupied 70% of the soft segment components of the elastomer was dissolved in DMF at 125° C. at a weight ratio of elastomer:DMF being 20:80.

The resulting solution was cast on the substrate obtained in Example 1, and was allowed to cool at room temperature for 30 minutes. After visually confirming that the entire coating layer formed by casting got cloudy in a white color, the substrate with the coating layer was immersed in hot water of 50° C. for 30 minutes, followed by drying at 80° C. The resulting surface coating layer was a porous polyester elastomer layer having a white color, good surface uniformity and a porosity of 65%.

Artificial leather made of the thus-obtained non-impregnated type substrate had leather-like flexibility and Example 8

Conventional surface coating using a polyurethane elastomer was applied on the non-impregnated type substrate obtained in Example 1. The resulting artificial leather made of a non-impregnated type substrate was inferior in air permeability and somewhat inferior (Δ) in light resistance as compared with the artificial leathers obtained in Examples 6 and 7, but had leather-like flexibility and compliant tightness.

Comparative Example 5

A surface-coated non-woven fabric was obtained in the same manner as in Example 6 except that passing of substrate through an aqueous silicone solution was not conducted. The surface-coated non-woven fabric had rubber-like high elasticity and was not suitable for use as an artificial leather.

Comparative Example 6

An artificial leather made of a non-impregnated type substrate was obtained in the same manner as in Example 6 except that no gelation was conducted at the time when surface coating by polyester elastomer was carried out. The surface layer of the artificial leather was a transparent film having a porosity of 5%. The artificial leather had an air permeability of 0 $cm^3/cm^2/s$ and high elasticity like a rubber and hence, was not suitable as an artificial leather.

TABLE 2

| | Density ($g/cm^3$) | Base fabric structure | Surface structure | Surface porosity (%) | Air permeability ($cm^3/cm^2/s$) | Light resistance | Handle |
|---|---|---|---|---|---|---|---|
| Ex. 6 | 0.37 | Non-impregnated type | Porous | 65 | 0.65 | ○ | ○ |
| Ex. 7 | 0.41 | Non-impregnated type | Spherulitic | 45 | 0.45 | ○ | ○ |
| Ex. 8 | 0.44 | Non-impregnated type | Porous | 30 | 0.12 | Δ | ○ |
| Comp. Ex. 5 | 0.37 | Non-impregnated type | Porous | 65 | 0.65 | ○ | X |
| Comp. Ex. 6 | 0.50 | Non-impregnated type | High density | 5.0 | 0.00 | ○ | X |

Ex: Example, Comp. Ex.: Comparative Example

Example 9

The binder fibers obtained in Referential Example 1 and the matrix fibers obtained in Referential Example 2 were mixed in amounts of 20% by weight and 80% by weight, respectively. The mixture was passed through a carding machine and then, subjected to a cross-laying method to produce a web. The web was subjected to a forced tanglement treatment using a needle punch (1,500 punches/$cm^2$) and then, to a shrinkage treatment in a hot water of 70° C. for one minute. Then, drying was conducted in an atmosphere of 120° C. The area shrinkage was 55%. Next, preheating was conducted in an atmosphere of 170° C. for 3 minutes and, immediately thereafter, embossing was conducted at 190° C. at 50 kg/cm (clearance was 70% of the thickness of substrate). In the embossing, there was used an embossing pattern having an areal ratio of concave portions: convex portions=50:50 and a length in the thickness direction of the concave portion and convex portion, of 20% of the substrate thickness. The resulting substrate had leather-like flexibility and compliant tightness. Then, the embossed side of the substrate was coated with a dimethylformaldehyde solution containing 18% of a polyurethane, in an amount of 800 $g/m^2$. The coated substrate was immersed in water for coagulation of polyurethane, washed with water, and dried to produce an artificial leather. The properties of the artificial leather are shown in Table 3.

Examples 10 and 11

Artificial leathers were obtained in the same manner as in Example 9 except that different embossing patterns were used. The results are shown in Table 3.

TABLE 3

| | Ex. 9 | Ex. 10 | Ex. 11 |
|---|---|---|---|
| Embossing conditions | | | |
| Areal ratio (concave portions):(convex portions) | 50:50 | 90:10 | 50:50 |
| Proportion of depth of concave and convex portions to substrate thickness | 20% | 20% | 5% |
| Properties of artificial leather | | | |
| Weight per unit area ($g/m^2$) | 420 | 420 | 420 |
| Thickness (mm) | 1.40 | 1.45 | 1.35 |
| Density ($g/cm^3$) | 0.30 | 0.29 | 0.31 |
| Proportions of heat-bonded portions (concave portions):(convex portions) | 58:42 | 52:48 | 52:48 |
| Peeling strength (kg/cm) | 3.5 | 3.1 | 3.3 |
| Bending resistance (cm) | 7.7 | 8.5 | 8.3 |
| Anti-buckling | ○ | ○ | ○ |
| Handle | ◎ | ◎ | ◎ |

Ex.: Example

[Explanation of symbols]

1: Matrix fibers

2: An elastic polymer arranged in binder fibers so as to be exposed at the fiber surface 3: A core arranged in binder fiber 4: A wholly heat-bonded portion as a single heat-bonded spot 5: A wholly heat-bonded portion as a composite heat-bonded spot 6: A partially heat-bonded portion as a single heat-bonded spot 7: A partially heat-bonded portion as a composite heat-bonded spot 8: An elastic heat-bonded spot

We claim:

1. A non-impregnated type substrate useful as a base fabric for artificial leather, which is a fiber assembly constituted by matrix fibers and binder fibers having an elastic polymer arranged on the surface thereof, the binder fibers being dispersed in and heat-bonded to the matrix fibers, wherein the substrate satisfies the following requirements (a) to (e):

(a) the proportion of the elastic polymer based on the total weight of the substrate is within a range of from 2.5 to 25% by weight, (b) the density of the substrate is within a range of from 0.15 to 0.45 $g/cm^3$, (c) the substrate contains in a scattered states (c-1) units of single heat-bonded spot each formed by the heat-bonding of the elastic polymer constituting the binder fiber to a single matrix fiber, and (c-2) units of composite heat-bonded spot each formed by the heat-bonding of the elastic polymer constituting the binder fiber to an assembly of a plurality of matrix fibers being in a close proximity to each other, (d) each unit of single heat-bonded spot and each unit of composite heat-bonded spot have (d-1) wholly heat-bonded portions at which part of matrix fibers are covered by the elastic polymer on the entire circumferential length in a state that the polymer is heat-bonded to the matrix fibers, and (d-2) partially heat-bonded portions at which the other part of matrix fibers are covered by the elastic polymer on the entire circumferential length in a state that part of the interface between the matrix fiber and the elastic polymer is heat-bonded and the remainder of the interface between the matrix fiber and the elastic polymer is in no contact state, (d-3) the ratio of the number of the wholly heat-bonded portions and the number of the partially heat-bonded portions being within a range of from 35:65 to 75:25, and (e) in each crossing point between the binder fibers, an elastic heat-bonded spot heat-bonded by the elastic polymer is formed.

2. A non-impregnated type substrate according to claim 1, wherein the proportion of the elastic polymer based on the total weight of the substrate is within a range of from 5 to 15%.

3. A non-impregnated type substrate according to claim 1, wherein the number of the matrix fibers being in a close proximity to each other is within a range of from 2 to 5.

4. A non-impregnated type substrate according to claim 1, wherein the ratio of the total number of the wholly heat-bonded portions and the partially heat-bonded portions and the total number of the elastic heat-bonded spots is within a range of from 95:5 to 50:50.

5. A non-impregnated type substrate according to claim 1, wherein the blending ratio of the matrix fibers and the binder fibers is within a range of from 95:5 to 50:50 by weight.

6. A non-impregnated type base material according to claim 1, wherein in part of the matrix fibers, at least 65% of the circumferential length of fiber cross section is in no contact with the elastic polymer.

7. A non-impregnated type substrate according to claim 1, wherein in part of the matrix fibers, at least 35% of the circumferential length of fiber cross section is in contact with the elastic polymer.

8. A non-impregnated type substrate according to claim 1, wherein part of the matrix fibers has a releasing agent adhered on the surface thereof.

9. A non-impregnated type substrate according to claim 8, wherein the ratio of the matrix fibers (A-1) having a releasing agent adhered thereon and the matrix fibers (A-2) having no releasing agent adhered thereon is within a range of from 99:1 to 20:80 by weight.

10. A non-impregnated type substrate according to claim 9, wherein the amount of the releasing agent adhered is within a range of from 0.1 to 5.0% by weight based on the fiber weight of the matrix fibers (A-1).

11. A non-impregnated type substrate according to claim 8, wherein the releasing agent is a silicon-based compound.

12. A non-impregnated type substrate according to claim 11, wherein the silicon-based compound is a polysiloxane.

13. A non-impregnated type substrate according to claim 1, wherein the binder fibers are constituted by elastic polymers and non-elastic polymers, the elastic polymer being exposed at the fiber surface.

14. A non-impregnated type substrate according to claim 1, wherein the elastic polymer is exposed so as to occupy at least 30% of the fiber surface area of the binder fibers.

15. A non-impregnated type substrate according to claim 13, wherein the elastic polymer and the non-elastic polymer both constituting binder fiber are conjugated so that the two polymers are not separated from each other when the binder fibers are subjected to a heating treatment under pressure.

16. A non-impregnated type substrate according to claim 13, wherein the elastic polymer is a polyester elastomer.

17. A non-impregnated type substrate according to claim 13, wherein the non-elastic polymer is a polybutylene terephthalate.

18. A non-impregnated type substrate according to claim 1, wherein at least part of the matrix fibers is highly shrinkable fibers.

19. A non-impregnated type substrate according to claim 1, wherein at least part of the matrix fibers is self-extensible fibers.

20. A non-impregnated type substrate according to claim 18, wherein the highly shrinkable fibers are formed of a non-elastic polyester polymer.

21. A non-impregnated type substrate according to claim 18, wherein the highly shrinkable fibers are formed of a non-elastic nylon polymer.

22. A non-impregnated type substrate according to claim 19, wherein the self-extensible fibers are formed of a non-elastic polyester polymer.

23. A non-impregnated type substrate according to claim 19, wherein the self-extensible fibers are formed of a non-elastic nylon polymer.

24. A non-impregnated type substrate according to claim 1, which has a 20%-elongation recovery of 50 to 90% in each of any two axes perpendicularly intersecting each other, present on any plane perpendicularly intersecting the thickness direction of the substrate.

25. A non-impregnated type substrate according to claim 1, which has a bending resistance of 2 to 20 cm, measured by the cantilever method, in each of any two axes perpendicularly intersecting each other, present on any plane perpendicularly intersecting the thickness direction of the substrate.

26. A non-impregnated type substrate according to claim 1, which has an air permeability in the thickness direction of 10 to 100 $cm^3/cm^2/sec$ at 124 Pa.

27. A non-impregnated type substrate according to claim 1, wherein at least two non-woven fabric layers each comprising matrix fibers and binder fibers different in blending ratio are laminated and the blending ratios of binder fibers between two adjacent non-woven fabric layers satisfy the following general formula (I):

$$10 \leqq |W1 - W2| \leqq 30 \qquad (I)$$

[wherein W1 and W2 are each the blending ratio (wt. %) of binder fibers in each of two adjacent non-woven fabric layers].

28. A non-impregnated type substrate according to claim 1, which has the heat-bonded portions having a regular density distribution relative to the planar direction of the substrate.

29. A non-impregnated type substrate according to claim 1, which has a large number of concave portions and convex portions at the surface.

30. A base fabric for artificial leather, comprising a substrate of claim 1 and an elastomer layer formed on the surface thereof.

31. A base fabric for artificial leather according to claim 30, wherein the elastomer layer consists substantially of a uniform porous structure or a uniform globular aggregation.

32. A base fabric for artificial leather according to claim 30, wherein the elastomer layer is formed substantially of a polyester elastomer.

33. A base fabric for artificial leather according to claim 30, wherein the elastomer layer is formed substantially of a polyurethane elastomer;

wherein the process comprises the following steps (f) and (g) successively and further comprises, at any stage prior to the step (g), a step of hindering the formation of heat-bonded portions between the two fibers at part of crossing points between the matrix fibers and binder fibers;

(f) a step in which a web containing at least matrix fibers and binder fibers is subjected to a forced tanglement treatment and a shrinkage treatment, and (g) a step in which the resulting non-woven fabric is subjected to a heating treatment under pressure at a heat-bonding temperature of the binder fiber.

34. A process for producing a non-impregnated type substrate, set forth in claim 1, useful as a base fabric for artificial leather, the non-impregnated type substrate being constituted by matrix fibers and binder fibers having an elastic polymer arranged to be exposed at the surface thereof and the binder fibers being dispersed in and heat-bonded to the matrix fibers, which process comprises the following steps (f) and (g) successively and further comprises, at any stage prior to the step (g), a step of hindering the formation of heat-bonded portions between the fibers at part of crossing points between the matrix fibers and binder fibers;

(f) a step in which a web containing at least matrix fibers and binder fibers is subjected to a forced tanglement treatment and a shrinkage treatment, and (g) a step in which the resulting non-woven fabric is subjected to a heating treatment under pressure at a heat-bonding temperature of the binder fiber.

35. A process for producing a non-impregnated type substrate according to claim 34, wherein in the step (f), at least two kinds of webs different in blending ratio of binder fibers are laminated and the resulting laminate is subjected to a forced tanglement treatment and a shrinkage treatment.

36. A process for producing a non-impregnated type substrate according to claim 34, wherein the hindrance of the heat-bonding between matrix fibers and binder fibers is conducted by adhering a releasing agent onto the surfaces of the matrix fibers.

37. A process for producing a non-impregnated type substrate according to claim 34, wherein the matrix fibers have a birefringence of 0.02 to 0.14 and a crystallinity of 10 to 35%, after having being subjected to a dry-heating treatment at 200° C. for 5 minutes.

38. A process for producing a non-impregnated type substrate according to claim 34, wherein the matrix fibers contain highly-shrinkable short fibers having a shrinkage of 20 to 70% when kept in a hot water of 70° C. for one minute and an elongation of 5 to 50% when, after having been kept in the hot water, subjected to a dry-heating treatment at 180° C. for one minute.

39. A process for producing a non-impregnated type substrate according to claim 34, wherein the matrix fibers contain self-extensible fibers causing substantially no shrinkage in hot water of 70° C. and having an elongation of 5 to 50% after having being subjected to a dry-heating treatment at 180° C. for one minute.

40. A process for producing a non-impregnated type substrate according to claim 34, wherein the heating treatment under pressure makes at least part of the points, at which the elastic polymers arranged in binder fibers are in contact with each other, to be heat-bonded thereby to form a network structure in the non-woven fabric.

41. A process for producing a non-impregnated type substrate according to claim 34, wherein the forced tanglement is conducted by the use of a needle punch.

42. A process for producing a non-impregnated type substrate according to claim 34, wherein the pressure employed in the heating treatment under pressure is a line pressure of 10 to 1,500 kg/cm.

43. A process for producing a non-impregnated type substrate according to claim 34, wherein the heating treatment under pressure is conducted using an embossing roll to form a large number of concave portions and convex portions at the surface of the substrate and form heat-bonded portions having regular density distribution relative to the planar direction of the substrate.

44. A process for producing a base fabric for artificial leather, wherein in producing a base fabric for artificial leather of claim 30 using a non-impregnated type substrate, a solvent composition consisting of an elastomer and a water-miscible polar solvent is cast on the surface of a non-impregnated type substrate of claim 1, and after cooling to cause gelation, the polar solvent is extracted from the solvent composition using an aqueous solvent.

45. A process for producing a base fabric for artificial leather according to claim 44, wherein the elastomer comprises, as the hard segments, a crystalline polyester whose main acid component is an aromatic dicarboxylic acid, and, as the soft segments, at least one polymer selected from the group consisting of a polyether, a low-crystalline polyester and a non-crystalline polyester.

46. A process for producing a base fabric for artificial leather according to claim 44, wherein the soft segments of the elastomer are composed only of a polyether.

47. A process for producing a base fabric for artificial leather according to claim 44, wherein the hard segments constituted by the crystalline polyester is constituted by at least one dicarboxylic acid selected from the group consisting of terephthalic acid, isophthalic acid, ester-forming derivatives thereof, and 2,6-naphthalenedicarboxylic acid.

48. A process for producing a base fabric for artificial leather according to claim 44, wherein the polar solvent is composed mainly of at least one solvent selected from the group consisting of N,N-dimethylformamide, N,N-dimethylacetamide and N-methylpyrrolidone.

49. A process for producing a base fabric for artificial leather formed of a non-impregnated type substrate, wherein in producing a base fabric for artificial leather of claim 30 using a non-impregnated type substrate, a porous polyurethane layer is first formed on the surface of a non-impregnated type substrate of claim 1 and then, a polyurethane finish film is formed thereon.

* * * * *